(12) United States Patent
Michel-Salaun et al.

(10) Patent No.: US 10,750,770 B2
(45) Date of Patent: Aug. 25, 2020

(54) COMBINATION OF NATURAL ANTIOXIDANTS

(71) Applicant: SPECIALITES PET FOOD, Elven (FR)

(72) Inventors: Françoise Michel-Salaun, Elven (FR); Nicolas Coneggo, Greenville, SC (US)

(73) Assignee: SPECIALITES PET FOOD, Elven (FR)

(*) Notice: Subject to any disclaimer, the term of this patent is extended or adjusted under 35 U.S.C. 154(b) by 25 days.

(21) Appl. No.: 15/776,309

(22) PCT Filed: Nov. 16, 2016

(86) PCT No.: PCT/EP2016/077818
§ 371 (c)(1),
(2) Date: May 15, 2018

(87) PCT Pub. No.: WO2017/085099
PCT Pub. Date: May 26, 2017

(65) Prior Publication Data
US 2019/0380372 A1    Dec. 19, 2019

(30) Foreign Application Priority Data
Nov. 16, 2015  (EP) ..................... 15306812

(51) Int. Cl.
| | | |
|---|---|---|
| *A23L 33/105* | (2016.01) | |
| *A23K 20/158* | (2016.01) | |
| *A23K 20/174* | (2016.01) | |
| *A23K 40/20* | (2016.01) | |
| *A23K 40/30* | (2016.01) | |
| *A23K 50/42* | (2016.01) | |
| *A23K 20/111* | (2016.01) | |
| *A23L 33/115* | (2016.01) | |
| *A23D 9/007* | (2006.01) | |
| *C11B 5/00* | (2006.01) | |

(52) U.S. Cl.
CPC ............ *A23L 33/105* (2016.08); *A23D 9/007* (2013.01); *A23K 20/111* (2016.05); *A23K 20/158* (2016.05); *A23K 20/174* (2016.05); *A23K 40/20* (2016.05); *A23K 40/30* (2016.05); *A23K 50/42* (2016.05); *A23L 33/115* (2016.08); *C11B 5/0035* (2013.01); *C11B 5/0092* (2013.01); *A23V 2002/00* (2013.01)

(58) Field of Classification Search
CPC ... A23L 33/105; A23L 33/115; A23K 20/158; A23K 20/174; A23K 40/20; A23K 40/30; A23K 50/42; A23K 20/111; A23D 9/007; C11B 5/0035; C11B 5/0092; A23V 2002/00

See application file for complete search history.

(56) References Cited

U.S. PATENT DOCUMENTS

| | | | |
|---|---|---|---|
| 5,348,755 A | 9/1994 | Roy | |
| 2005/0175762 A1* | 8/2005 | Richards | A23B 4/20 426/601 |
| 2008/0233244 A1* | 9/2008 | Swenson | A23J 3/16 426/72 |
| 2013/0251865 A1* | 9/2013 | Cutler | A23K 20/105 426/321 |
| 2013/0309300 A1* | 11/2013 | Lopez Mas | A23D 7/005 424/455 |
| 2014/0248361 A1* | 9/2014 | Mooppil | A61K 8/9789 424/489 |

FOREIGN PATENT DOCUMENTS

WO    WO 2013/036934 A1    3/2013

OTHER PUBLICATIONS

"Natural antioxidants: sources, compounds, mechanisms of action, and potential applications," Comprehensive Reviews in Food Science and Food Safety, vol. 10, No. 4, 2011, pp. 221-247.
Haak et al., "Effect of dietary antioxidant and fatty acid supply on the oxidative stability of fresh and cooked pork," Meat Science, vol. 74, No. 3, 2006, pp. 476-486.
Haak et al., "Effect of dietary rosemary and α-tocopheryl acetate on the oxidative stability of raw and cooked pork following oxidized linseed oil administration," Meat Science, vol. 78, No. 3, 2008, pp. 239-247.
International Search Report (Form PCT/ISA/210) for Application No. PCT/EP2016/077818, dated Feb. 22, 2017.
Iwai et al., "Quality maintaining agent for foods, esp. fish—contains extract of green tea leaves, tocopherol and/or rosemary extract and opt. gallic acid," WPI/THOMSON, vol. 1990, No. 19, AN 1990-144875, Apr. 3, 1990, 1 page.
Pokorny et al., "The use of natural antioxidants in food products of plant origin," Antioxidants in Food, 2001, pp. 355-364.
Schwarz et al., "Activities of antioxidants are affected by colloidal properties of oil-in-water and water-in-oil emulsions and bulk oils," Journal of Agricultural and Food Chemistry, vol. 48, No. 10, 2000, pp. 4874-4882.

(Continued)

*Primary Examiner* — C. Sayala
(74) *Attorney, Agent, or Firm* — Birch, Stewart, Kolasch & Birch, LLP

(57) ABSTRACT

The present invention concerns an antioxidant combination of at least tocopherols, carnosic acid and hydrolysable gallotannins, wherein: —the amount of tocopherols is less than about 500 ppm, and—the ratio of carnosic acid:hydrolysable gallotannins ranges from about 1:4 to about 3:1. The present invention also concerns an antioxidated fat-containing composition comprising this antioxidant combination. The present invention also concerns a method for enhancing the antioxidant effect of tocopherols in a fat-containing composition, as well as the use of the antioxidant combination for enhancing the antioxidant effect of tocopherols in a fat-containing composition.

11 Claims, 6 Drawing Sheets

(56) References Cited

OTHER PUBLICATIONS

Senanayake, "Green tea extract: Chemistry, antioxidant properties and food applications—A review," Journal of Functional Foods, vol. 5, No. 4, 2013, pp. 1529-1541 (pp. 1-13).

Trojáková et al., "Antioxidant activity of rosemary and sage extracts in rapeseed oil," Journal of Food Lipids, vol. 8, No. 1, 2001, pp. 1-13.

Vicente et al., "Isolation of carsonic acid from rosemary extracts using semi-preparative supercritical fluid chromatography," Journal of Chromatography A, vol. 1286, 2013, pp. 208-215.

* cited by examiner

COMBINATION OF NATURAL ANTIOXIDANTS

The present invention generally relates to the field of antioxidation of fats.

More precisely, the present invention concerns an antioxidant combination of specific natural antioxidants, in particular useful for enhancing the antioxidant effect of tocopherols in a fat-containing composition.

BACKGROUND OF THE INVENTION

Fats and oils are a major constituent of cosmetics, pharmaceuticals and foods, in particular pet foods. For the two former, fats and oils contribute to their texture, odor and/or flavor as well as proper activities of the active ingredients contained therein. In the latter, fats and oils contribute to their texture, odor and/or flavor, nutritional value, texture and palatability.

However, lipids are highly susceptible to oxidation during processing or storage, which can lead to rancidity and/or reduce the nutritional value of the product that is finally used. In particular, this results in a food, such as a pet food, being unpalatable, and nutritionally unsatisfying for the subject, such as the pet.

As a consequence, antioxidants are commonly added to fat-containing compositions, such as cosmetics, pharmaceuticals or foods, such as pet foods, to delay the unavoidable fat oxidation process and to extend the shelf life of the fat-containing composition, for example the food product, such as the pet food product.

In order to evaluate the efficacy of antioxidants in fat-containing compositions, several indicators are used such as the period of protection, i.e. the period of time before oxidation of fat starts, or the quantification of primary fat-oxidation products, such as the peroxide value (PV) or secondary fat-oxidation products, such as the hexanal value (HV).

Synthetic antioxidants are widely used to protect oils and fats in the cosmetic, pharmaceutical and food/pet food industries. Due to the possible adverse effects of synthetic preservatives on health, the consumer's demand for natural antioxidants has tremendously increased in the past decades. Various vegetable extracts have been investigated and hundreds of molecules with different chemical structures have been identified as effective natural antioxidants (Brewer, 2011; Pokorny et al., 2001).

The patent application JP19880240514 mentions an agent containing (a) an extract of green tea leaves and (b) tocopherols and/or extract of rosemary, optionally with (c) gallic acid. However, this patent application is silent about the amounts and/or ratios of these compounds. As well known by the skilled person, green tea leaves mainly comprise polyphenols (catechins, epicatechins etc.) but only contain traces of quercetin. In a review, Namal Senanayake (2013) reports an amount of 25 to 35% of polyphenols by dry weight of green tea leaves, predominantly catechins. The publication "Effect of dietary rosemary and α-tocopherols acetate on the oxidative stability of raw and cooked pork following oxidized linseed oil administration", L. Haak et al., Meat Science 78 (2008) 239-247, studies the effect on the oxidative stability of raw and cooked pork of a 2% dietary administration to pigs of oxidized linseed oil either or not in combination with antioxidants, containing for example α-tocopheryl acetate and/or rosemary extract and/or gallic acid. However, these compounds did not protect the feed against oxidation as they were encapsulated so as to be released only during digestion of pigs. Moreover, a significant lipid pro-oxidant effect of the combination of rosemary extract and gallic acid was observed.

Tocopherols are currently one of the most commercialized natural antioxidants. They exist in most of vegetable oils and have been extensively studied. Tocopherols are widely used in the field of cosmetic, pharmaceutical and food/pet food industries, in particular because these natural antioxidants do not negatively impact the essential functional properties of the products to be obtained (for example, palatability of pet foods).

However, a major issue to the use of tocopherols lies in a relatively short period of protection, the fat-oxidation in a fat-containing composition being frequently less delayed over time than when using other antioxidants, such as synthetic antioxidants.

Furthermore, high peroxide value and hexanal value have been observed when using tocopherols as the sole antioxidant in a fat-containing composition.

Moreover, it has been found that a high amount of tocopherols is lost when added to a fat-containing composition further subjected to a physical and/or thermal treatment, such as during extrusion.

It is recognized that there is a need for an antioxidant combination of natural antioxidants, said combination being useful for enhancing the antioxidant effect of tocopherols in a fat-containing composition.

An object of the invention is thus to provide a combination of natural antioxidants that significantly enhances the antioxidant effect of tocopherols in a fat-containing composition.

Another object of the invention is to provide a combination of natural antioxidants that can be used for significantly delaying fat-oxidation over time in a fat-containing composition and/or for decreasing the loss of tocopherols under a physical and/or thermal treatment of a fat-containing composition.

Another object of the invention is to provide a combination of natural antioxidants having the ability to at least preserve the palatability compared to a product that does not contain a combination of natural antioxidants of the invention.

SUMMARY OF THE INVENTION

The present invention concerns an antioxidant combination of at least tocopherols, carnosic acid and hydrolysable gallotannins, wherein:
the amount of tocopherols is less than about 500 ppm, and
the ratio of carnosic acid:hydrolysable gallotannins ranges from about 1:4 to about 3:1.

The present invention also concerns an antioxidated fat-containing composition comprising this antioxidant combination.

The present invention also concerns a method for enhancing the antioxidant effect of tocopherols in a fat-containing composition, as well as the use of the antioxidant combination for enhancing the antioxidant effect of tocopherols in a fat-containing composition.

BRIEF DESCRIPTION OF THE FIGURES

The present invention is illustrated by reference to the following accompanying figures.

DEFINITIONS

Figure 1:
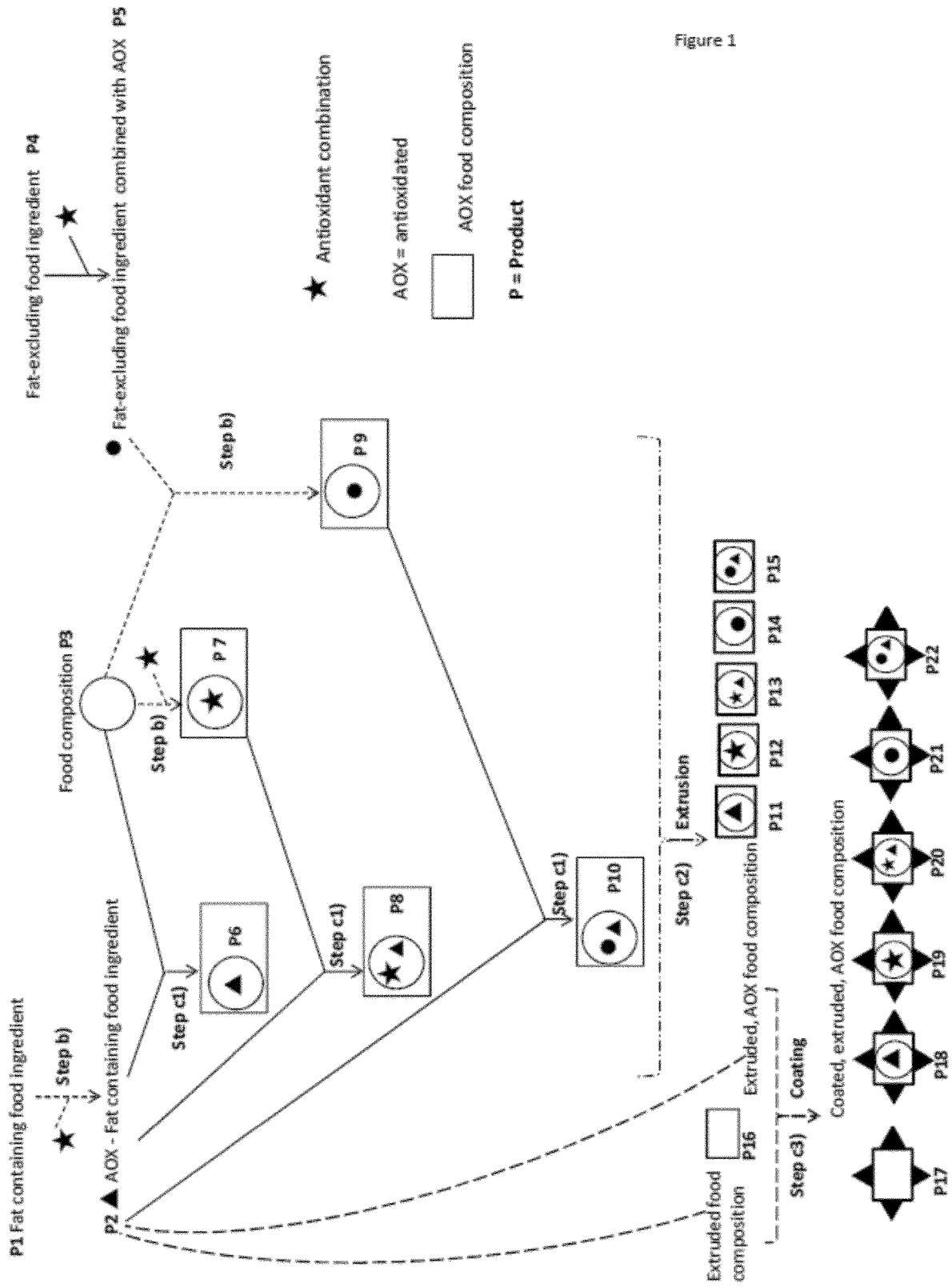
FIG. 1: Schematic representation of some preferred embodiments of the present invention.

Unless specifically stated otherwise, amounts (in particular amount in ppm) or percentages are expressed herein by weight of a product reference, for example a fat-containing composition according to the invention.

In the present disclosure, ranges are stated in shorthand, so as to avoid having to set out at length and describe each and every value within the range. Any appropriate value within the range can be selected, where appropriate, as the upper value, lower value, or the terminus of the range. For example, a range of 0.1-1.0 (from 0.1 to 1) represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. Moreover, the terms "at least" and "less than" encompass the hereafter cited value. For example, "at least 5%" has to be understood as also encompassing "5%" and "less than 5 ppm" to be understood as also encompassing "5 ppm".

The term "about" as used herein when referring to a measurable value such as an amount, a temporal duration, and the like, is meant to encompass standard variations which can easily be determined by the skilled person in the technical domain of reference. Preferably, unless specifically stated otherwise these values are meant to encompass variations of ±5%.

The term "out of ratio" as used in the present invention means that the ratio of carnosic acid:hydrolysable gallotannins is outside from the ranges of ratios according to the present invention.

As used throughout, the singular form of a word includes the plural, and vice versa, unless the context clearly dictates otherwise. Thus, the references "a", "an", and "the" are generally inclusive of the plurals of the respective terms. For example, reference to "a method" or "a food" includes a plurality of such "methods" or "foods". Similarly, the words "comprise", "comprises", and "comprising" are to be interpreted inclusively. Likewise the terms "include", "including" and "or" should all be construed to be inclusive. All these terms however have to be considered as encompassing exclusive embodiments that may also be referred to using words such as "consist of".

The methods and compositions and other embodiments exemplified here are not limited to the particular methodologies, protocols, and reagents that are described herein because, as the skilled artisan will appreciate, they may vary.

Unless defined otherwise, all technical and scientific terms, terms of art, and acronyms used herein have the meanings commonly understood by the skilled artisan in the field(s) of the invention, or in the field(s) where the term is used. Although any products, methods, or other means or materials similar or equivalent to those described herein can be used in the practice of the present invention, the preferred combinations, compositions, methods, or other means or materials are described herein.

The term "ppm" is herein used according to its conventional meaning. More precisely, it refers herein to a weight amount relative to the total weight of the antioxidant combination (mg/kg) (unless otherwise indicated).

The term "subject" refers herein to a pet or a human being.

The terms "pet" and "animal" are synonymous and mean any animal including, without limitation, cats, dogs, shrimps, fish, rabbits, guinea pigs, ferrets, hamsters, mice, gerbils, birds, horses, cows, goats, sheep, donkeys, pigs, and the like. In the context of the present invention, pets such as dogs, cats and fish are preferred. More particularly, dogs and cats are preferred.

As used herein, the term "antioxidant" refers to any molecule that delays or prevents the oxidation of an oxidizable fat. In the context of the present invention, antioxidants thus act at least on the antioxidation of lipids, i.e. fats. Antioxidants act by: scavenging biologically important reactive free radicals or other reactive oxygen species, preventing oxygen radical formation, catalytically converting the free radical or other reactive oxygen species to a less reactive species, chelating transition metals, and/or regenerating primary antioxidant.

As used herein, it has to be understood that the antioxidants used in the present invention are natural antioxidants which are added, i.e., exogenous when considering the composition recipe. In other words, are specifically excluded from the calculation of all claimed antioxidant amounts and ratios, endogenous antioxidants and synthetic antioxidants. This means that external, natural antioxidants are added to the composition described herein whatever the presence of one or more endogenous (intrinsic) antioxidants as a result of the composition recipe.

Antioxidants are either lipophilic or hydrophilic antioxidants.

Furthermore, antioxidants of the invention can be used in any appropriate form. In a particular embodiment, materials, such as vegetable materials, or extracts or parts or extracts of parts of materials, including concentrate or juice, and which contain a non-negligible amount of antioxidant can be used. In another particular embodiment, pure antioxidant can be used.

The term "antioxidated" or "antioxidated product X" means that product X comprises an antioxidant combination of the invention. Hereinafter and for sake of clarity, an "antioxidant combination" may be shortly referred to as a "combination".

As used herein, "enhancing the antioxidant effect of tocopherols" or "enhance the antioxidant effect of tocopherols" means that the antioxidant effect obtained in a fat-containing composition with a combination according to the invention, i.e. combining at least tocopherols, carnosic acid and hydrolysable gallotannins, is significantly better than the antioxidant effect obtained in a fat-containing composition with tocopherols alone. In particular, the antioxidant effect of tocopherols is enhanced by significantly delaying fat-oxidation over time in a fat-containing composition (i.e. compared to the use of tocopherols alone) and/or by decreasing the loss of tocopherols under a physical and/or thermal treatment of a fat-containing composition.

As used herein, "delaying fat-oxidation over time" means that the time of protection is increased. The term "time of protection" or "time period of protection" or "period of protection" refers to the period of time before oxidation starts in a fat compared to the period of time before oxidation starts in a control fat. It is calculated as follows: Time of protection (hours)=Induction time of oxidation for a fat containing antioxidant(s) (hours)—induction time of oxidation for a control fat without added antioxidant (hours).

As used herein, "decreasing the loss of tocopherols under a physical and/or thermal treatment of a fat-containing composition" means that the residual proportion of tocopherols in the tested fat-containing composition at the end of said physical and/or thermal treatment is higher when the composition comprises the combination of the invention that when the composition comprises only tocopherols as natural antioxidant.

The term "tocopherols" refers either to isomers alpha, beta, gamma and/or delta of tocopherols and/or or derivatives thereof. When referring to "natural mixed tocopherols", it is meant the combination of alpha, beta, gamma and delta tocopherols, in their natural form (in particular not esterified).

The term "carnosic acid" refers to a phenolic diterpene with chemical formula $C_{20}H_{28}O_4$ and/or derivatives thereof, for example found in vegetable materials such as rosemary (*Rosmarinus officinalis*) or common sage (*Salvia officinalis*). The term "carnosic acid" as used herein encompasses carnosic acid and/or carnosol (chemical formula $C_{20}H_{26}O_4$).

"Rosemary" refers either to all of the vegetable material (*Rosmarinus officinalis*) or to any extract, part, or extract of a part of the vegetable material, for example from the leaves. Rosemary can comprise, in addition to carnosic acid (and carnosol), rosmarinic acid and/or rosmanol.

The term "hydrolysable gallotannin" are polymers formed with gallic acid, a polyphenol monomer, and bound with the hydroxyl group of a polyol carbohydrate such as glucose. "Hydrolysable gallotannins" as used herein encompasses hydrolysable gallotannins, such as tannic acid, as well as hydrolysis products such as gallic acid.

The term "quercetin" refers to a polyphenolic flavonoid compound, with chemical formula $C_{15}H_{10}O_7$ and/or derivatives thereof, such as dihydroquercetin (chemical formula $C_{15}H_{12}O_7$), that can be found in several vegetables such as Larch or *Dimorphandra mollis*. In a particular embodiment, quercetin is thus in the form of dihydroquercetin.

The term "hydroxytyrosol" refers to 3,4-dihydroxyphenylethanol, with chemical formula $C_8H_{10}O_3$, and/or derivatives thereof, such as tyrosol, that may be obtained from vegetable material such as olive.

"Olive" refers to either to all of the vegetable material or to any extract, part, or extract of a part of from the vegetable material, for example from the leaves, fruit, pulp, kernel, vegetation water of olive oil production and/or oil of olive. Olive can comprise, in addition to hydroxytyrosol (and tyrosol), oleuropein and/or ligstroside.

By the terms "appropriate carrier" (also referred to herein as "carrier"), it is meant herein a usually inactive substance (i.e., an inactive molecule or an inactive mix of molecules) that is used in association with a combination of the invention. Typically, a carrier aids the application of said combination. Appropriate carriers may be in a powder or liquid form and may have hydrophilic and/or lipophilic properties. Examples of appropriate carriers in liquid form are water or oils (e.g. rapeseed oil, soya oil, sunflower oil). Examples of appropriate carriers in powder form are carbohydrates (e.g., maltodextrin, cyclodextrin), microbial proteins (e.g., yeasts), vegetable proteins (e.g., soya flour, soya protein concentrates, soya protein isolates), animal proteins, mineral or organic compounds (e.g. clay, bentonite, silica), and the like.

As used herein, a "fat-containing composition" is any ingredient, composition or material containing at least one fat which is oxidizable. A fat-containing composition refers either to an ingredient, composition or material containing at least one fat which is oxidizable and which is usable in developing cosmetics, pharmaceuticals and foods. The fat content of a "fat-containing composition" according to the invention is not "traces of fat". The term "traces of fat" as used herein means negligible fat amount, or an insignificant fat amount, or an undetectable fat amount (below the threshold level determined by standard methods, such as described in European Regulation EC no 152/2009 Determination of crude oils and fats-Procedure B—available online).

Examples of fats include fats or oils from any origin, such as animal fats, vegetable oils or marine oils. Vegetable oils which are available in large quantities are typically canola oil, soybean oil, corn oil, olive oil, sunflower oil, linseed oil, palm oil, rapeseed oil, sesame oil, coconut oil, safflower oil, and the like, as well as by-products thereof. Typical animal fats are pork fat, chicken fat, poultry fat, lamb tallow or beef tallow and the like, as well as by-products thereof. Marine oils are typically tuna oil, sardine oil, salmon oil, herring oil, mackerel oil, sand eel oil, trout oil, tilapia oil, catfish oil, anchovy oil, fish oil, menhaden oil and the like, as well as by-products thereof. Also are encompassed herein the fats that are derived from animal, vegetable, marine sources.

Fats are for example fatty acid esters or free fatty acids which are saturated or unsaturated and they can be endogenous (such as fats contained in animal digests, animal or vegetable meals, etc.) or exogenous.

The term "food" or "food product" or "food composition" as used herein means a product or composition containing at least one fat which is oxidizable and that is intended for ingestion by a subject and provides at least one nutrient to the subject. "Food" encompasses such products in any form, solids, liquids, gels, or mixtures or combinations thereof. A combination according to the present invention may be added to any food products (containing at least one fat as defined above). Non limiting examples of food compositions are nutritional formulas, dairy products, ice creams, creamers, pet food products, drinks, nutraceuticals, food additives, food supplements, confectionary, chocolate based products, seasoning products, mayonnaise, soups, frozen meals, cakes, baking products, cereals based-products, and desserts. Food compositions as used herein encompass also food preparations which can be further processed, such as for example food preparations which are further subjected to thermal treatment and/or extrusion and/or retorting.

The term "pet food" or "pet food product" or "pet food composition" refers to a food that is intended for consumption by a pet. For instance, a "dog food" or a "dog food product" means a composition intended for consumption by a dog. As another example, a "cat food" or a "cat food product" means a composition intended for consumption by a cat. "Pet food" encompasses pet feed, such as fish feed, hereinafter called "fish food". A "fish food" thus means a composition intended for consumption by a fish.

Pet foods encompass herein dry pet foods (having less than about 14% moisture), canned or wet or high moisture-containing pet foods (having more than about 50% moisture) and semi-moist pet foods (having from about 14% to about 50% moisture). Examples of pet foods are extruded pet foods such as kibbles, chunk-in-"X" products, loafs, snacks, treats, drinks or pet food supplements.

A "nutritionally-complete", "nutritionally-balanced" or "complete and nutritionally-balanced food" is one that contains all known required nutrients for the intended recipient or consumer of the food, in appropriate amounts and proportions based, for example, on recommendations of recognized or competent authorities in the field of companion animal nutrition. Such foods are therefore capable of serving as a sole source of dietary intake to maintain life, without the addition of supplemental nutritional sources. Thus, such foods do not comprise food supplements, snacks, beverages and treats, as defined below. A nutritionally-complete food can be, for example, in the form of extruded pet foods such as kibbles, chunk-in-"X" products and loafs, as defined below.

An "extruded" product, such as food or pet food, refers to any product having been transformed by extrusion or pelleting process. Preferably, an extruded product is a dry extruded product. In a particular embodiment, an extruded product is a kibble. In another particular embodiment, an extruded product is a fish pellet.

The term "fish pellet" refers to a fish food, in particular a dry extruded product (containing less than about 14% moisture, preferably less than about 9% moisture) which can be obtained by extrusion or pelleting process, preferably a pelleting process. Fish pellets are typically composed of one or more protein sources such as, but not limited to, marine protein including, inter alia, fish meal and krill meal, vegetable protein and slaughterhouse by-products. Fish pellets further typically contain fats such as marine oils and/or vegetable oils and/or animal fats, either included into pellets or coated onto pellets.

The term "kibble" used herein refers to particulate chunks or pieces formed by either a pelleting or extrusion process, preferably an extrusion process. Typically, kibbles are produced to give dry and semi-moist pet food. In a particular embodiment, kibbles are dry kibbles. The pieces can vary in sizes and shapes, depending on the process or the equipment. For instance, kibbles can have spherical, cylindrical, oval, or similar shapes. They can have a largest dimension of less than about 2 cm for example. Kibbles typically contain fats such as animal fats and/or vegetable oils and/or marine oils, either included into kibbles or coated onto kibbles.

The term "chunk-in-"X" products" means herein all edible wet foodstuffs which comprise chunks in a mixture (said mixture being "the X mixture"). Classical examples thereof are chunk-in-jelly products, chunk-in-gravy products, and the like. This category of "chunk-in-X" products encompasses also edible forms other than chunks that may be contained in the X mixture such as a jelly, a gravy, and the like. For instance, other forms than chunks may be sliced products, grated products, etc. Chunk-in-"X" products typically include fats such as animal fats and/or vegetable oils and/or marine oils.

The term "loaf" used herein refers to edible foodstuffs obtained as moist products, and includes terrines, pâtés, mousses, and the like. Loafs typically include fats such as animal fats and/or vegetable oils and/or marine oils.

The term "food supplement" or "dietary supplement" or "supplement" means a product that is intended to be ingested in addition to the normal diet. Supplements may be in any form, e.g., solid, liquid, gel, tablets, capsules, powder, and the like. Preferably they are provided in convenient dosage forms. In some embodiments, they are provided in bulk consumer packages such as bulk powders, liquids, gels, or oils. In other embodiments, supplements are provided in bulk quantities to be included in other food items such as snacks, treats, supplement bars, beverages, and the like. Food supplements typically contain fats such as animal fats and/or vegetable oils and/or marine oils, either included into food supplements or coated onto food supplements.

The term "treat" means any food item that is designed to be fed to a pet, preferably at non-meal time, by the owner to help, promote or sustain a bonding process between a pet and its owner. Examples of treats are bones, rawhides, sticks, pillows, biscuits, and the like. Treats may be nutritional or not, entirely or partially consumable (e.g., consumable toys). Treats often contain palatability enhancers in a manner comparable to nutritionally-balanced foods. Treats typically contain fats such as animal fats and/or vegetable oils and/or marine oils, either included into treats or coated onto treats.

As used herein, a "food ingredient" is any compound, composition or material that is suitable for consumption and that can be added into a food composition.

In particular, a "pet food ingredient" is any compound, composition or material that is suitable for consumption for pets and that can be added into a pet food composition. Non-limiting examples of pet food ingredients are proteins, peptides, amino acids, grains, carbohydrates, fats or lipids, nutrients, palatability enhancers, animal digests, meat meals, gluten, preservatives, surfactants, texturing or texturizing or stabilizing agents, colouring agents, inorganic phosphate compounds, flavors, seasonings, etc.

As used herein, a "fat-containing food ingredient" refers to a "food ingredient", such as in particular a pet food ingredient, containing at least one fat which is oxidizable and which may further be added to a food composition, in particular to a pet food composition.

As used herein, a "fat-excluding food ingredient" refers to a "food ingredient", such as in particular a pet food ingredient, which does not contain any oxidizable fat or which contains only traces of fats and which may further be added to a food composition, in particular to a pet food composition.

As used herein, the term "palatability" refers to the overall willingness of a subject to eat a certain food composition. Whenever a subject shows a preference, for example, for one of two or more foods, the preferred food is more "palatable", and has "enhanced palatability". Such preference can arise from any of the subject's senses, but typically is related to, inter alia, taste, aroma, flavour, texture, smell and/or mouth feel.

Different methods exist to assess palatability, such as palatability of pets. Examples of such methods involve exposure of pets to pet foods either simultaneously (for example, in side-by-side, free-choice comparisons, e.g., by measuring relative consumption of at least two different pet foods), or sequentially (e.g., using single bowl testing methodologies). Advantageously, at least two different methods may be used to consolidate the thus obtained results on palatability of a given petfood.

From a functional point of view, the terms "palatability enhancers (PEs)", "palatants", "flavours", "palatability agents", "appetizing factors", "flavour compositions", "palatability-enhancing compositions (PECs)", "flavour enhancers", and any other similar terms equivalently mean any material that enhances the palatability of a food composition to a subject. Typically, a palatability enhancer for food is an edible composition that provides an aroma, taste, aftertaste, smell, mouth feel, texture, and/or organoleptic sensation that is appealing or pleasing to the subject.

For example, a palatability-enhancing composition may contribute to initial food appeal by its smell and/or to continued consumption by its smell but also by its taste and/or its aftertaste, and/or its mouth feel, and/or its texture. For example for the pets, "initial appeal" is an aspect of palatability that induces a pet to initially taste or try a food, and that can be measured by the criteria "first choice" or "first food consumed". "Continued consumption" is an aspect of palatability that induces a pet to continue consuming a food that has been initially only tasted or tried.

From a structural point of view, the terms "palatability enhancers (PEs)", "palatants", "flavours", "palatability agents", "appetizing factors", "flavour compositions", "palatability-enhancing compositions (PECs)", "flavour enhancers", and any other similar terms may refer to a single material or a blend of materials, that may be natural, processed or unprocessed, synthetic, or part of natural and part of synthetic materials.

Non-limiting examples of palatability-enhancing ingredients of a palatability-enhancing composition are animal digests, vegetarian palatability-enhancing composition ingredients, inorganic phosphate compound, Maillard ingredients, Maillard reaction products, proteins, peptides, amino acids, carbohydrates, fats, nutrients, preservatives, surfactants, texturing agents, flavors, etc. Ingredients may be comprised in a palatability-enhancing composition, or they can be contacted into the pet food and react in situ for producing transformed materials that are also encompassed by the term "palatability-enhancing composition". Examples of ingredients that react together in the composition are, without limitation, fats, peptides, amino acids, and carbohydrates, so as to obtain transformed materials such as Maillard reaction products, and the like.

The term "inorganic phosphate compound" as used herein means a chemical compound comprising at least one phosphorus atom. This chemical compound may be natural or synthetic, ionized or not. Examples of inorganic phosphate compounds include polyphosphates, pyrophosphates, and monophosphates.

The term "animal digest" means herein material which results from chemical and/or enzymatic hydrolysis of clean, undecomposed animal tissue. In some embodiments, an animal digest as used herein is fully consistent with the definition promulgated by the Association Of American Feed Control Officials, Inc. (AAFCO). Animal digest is preferably derived from animal tissues, including cold-blooded marine animals, excluding hair, horns, teeth, hooves, and feathers. The skilled artisan will appreciate that while such tissues are not preferred, trace amounts might be found unavoidably even under good manufacturing practices. Also not included are visceral contents or foreign or fecal matter, although trace contaminant amounts are sometimes present. An animal digest may be dried or not. Examples of animal digests are:

digest of poultry (or pork, beef, sheep, lamb, fish, etc): material from poultry (pork, beef, etc) which results from chemical and/or enzymatic hydrolysis of clean and undecomposed tissue;

digest of pork (or beef, sheep, lamb, fish, etc) by-products: material from pork (beef, etc.) which results from chemical and/or enzymatic hydrolysis of clean and undecomposed tissue from non-rendered clean parts from cattle (pigs, sheep, lamb, etc), other than meat, for example lungs, spleen, kidneys, brain, livers, blood, partially-defatted low-temperature fatty tissue, and stomachs and intestines, freed of their contents;

digest of poultry by-products: material which results from chemical and/or enzymatic hydrolysis of clean and undecomposed tissue from non-rendered clean parts of poultry, other than meat, such as livers, hearts, heads, feet, and viscera. As used herein, "poultry" encompasses any species or kind of bird, preferably chicken, turkey, duck, and the like; and digest of fish by-products: material which results from chemical and/or enzymatic hydrolysis of clean and undecomposed tissue from non-rendered clean parts from fish, other than meat. As used herein, "fish" encompasses any species or kind of fish or crustaceans, preferably tuna, salmon, cod, whitefish, shrimp, sardine, and the like.

Animal digests may also be referred to as "animal products" or "animal by-products", all these terms being used herein as synonymous.

"Proteins" include all conventional protein sources that are compatible for animal consumption, especially vegetable proteins, animal proteins (such as casein or albumin or animal digests or meat meals), and microbial proteins (such as yeast or fungi or algal). The term "meat meal" means the meal obtained from carcasses of the above mentioned animals, i.e. poultry, pork, beef, sheep, lamb, fish. "Protein" also includes protein hydrolysates, the degree of hydrolysis of which can be controlled depending on the objective.

The term "yeast" herein refers to any yeast, preferably inactive, as well as to yeast by-products that are compatible with compositions for animal consumption. Yeasts are well known in the art as being protein-rich. Yeasts include, without limitation, brewer's yeast, baker's yeast, torula yeast, molasses yeast, and the like. Yeast by-products include, without limitation, yeast extracts, yeast hydrolysates, cream yeasts, etc.

The term "grain" means a cereal grain that may be used as a source of nutrients (e.g., proteins, starch, minerals, and vitamins). Examples of grains are corn, milo, alfalfa, wheat, barley, rice, soy, sorghum, and the like.

The term "gluten" means a protein fraction from wheat, corn, rye, barley, oats or their crossbred varieties and derivatives thereof.

The term "vegetable" as used herein encompasses plants. Examples of vegetables are canola, soybean, corn, olive, sunflower, linseed, palm, safflower, rapeseed, wheat, corn, lupine, pea or rice.

The term «vegetarian palatability-enhancing composition ingredients» means herein materials free of meat or animal products, and derived from or isolated from vegetable, bacterial, fungal or algal sources, or single compounds not obtained from animal sources. Vegetarian palatability-enhancing composition ingredients can be dry or liquid.

Examples of carbohydrates include dextrose, fructose, sucrose, polysaccharides, fibers, starches, and the like.

"Fiber source" or "dietary fiber" refers to food ingredients corresponding to components of a vegetable that are resistant to digestion by animal's digestive enzymes. Fiber can be soluble or insoluble. Sources of dietary fiber for use in the diets disclosed herein include, but are not limited to, beet pulp, guar gum, chicory root, psyllium, cellulose, wheat oat, corn bran, flax seed, and the like.

Examples of nutrients include, without limitation, vitamins, minerals and electrolytes, such as vitamins A, C, E, B12, D3, folic acid, D-biotin, cyanocobalamin, niacinamide, thiamine, riboflavin, pyridoxine, menadione, beta-carotene, calciumpantothenate, choline, inositol, calcium, potassium, sodium, zinc, iron, manganese, copper, iodine, and the like.

Surfactants, seasonings, texturing agents or texturizing agents, preservatives, stabilizing agents which may be used in the context of the present invention are well known by the skilled person.

"Pharmaceutical compositions" or "pharmaceutical products" refers to pharmaceutically-acceptable compositions containing at least one fat, such as tablets (e.g. chewable tablets, effervescent tablets or film coated tablets), or capsules (e.g. hard shell capsules), or liquid or dissolved powders. Pharmaceutical compositions may be administered to a subject by a variety of conventional routes of administration, for example by oral, parenteral, topical, or transdermal administration.

As used herein, a "fat-containing pharmaceutical ingredient" is any compound, composition or material containing at least one fat which is oxidizable and which can be added into a pharmaceutical composition. Fat-containing pharmaceutical ingredients can typically be added as powders to a tableting mixture or filled into capsules in a manner per se known for the production of capsules.

The term "cosmetic" or "cosmetic product" as used herein encompasses cosmetics, toiletries and derma products containing at least one fat which is oxidizable. Examples are skin and hair care products such as creams, lotions, baths, shampoos, conditioners, lipsticks, sunscreen cosmetics, makeup cosmetics, sprays or gels.

As used herein, a "fat-containing cosmetic ingredient" is any compound, composition or material containing at least one fat which is oxidizable and which can be added into a cosmetic composition.

"Coating" or "coated", as used herein, refers to the topical deposition of a product or a composition, such as a fat-containing composition of the invention, onto the surface of the food, such as by spraying, dusting, and the like. A combination of the invention may be added to a food by coating, typically in a mixture with one or more fat and/or palatability-enhancing composition, in particular a palatability-enhancing composition comprising fat.

"Inclusion" or "included", as used herein, refers to the addition of a product or a composition, such as a fat-containing composition of the invention, into the core of a food, such as a pet food. For example, inclusion of a fat-containing composition in a food, such as a pet food, can be made by mixing it with other food ingredients, for example fat-containing pet food ingredients. If necessary, further processing steps can be performed for obtaining the final pet food product (including thermal treatment and/or extrusion and/or retorting, etc).

"Containers" include, but are not limited to, bags, boxes, cartons, bottles, packages of any type or design or material, over-wrap, shrink-wrap, stapled or otherwise affixed elements, or combinations thereof.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, stapled or otherwise affixed components, or combinations thereof. A single package may be containers of individual components physically associated such that they are considered a unit for manufacture, distribution, sale, or use.

As used herein, "means for communicating information or instructions" is a kit component under any form suitable for providing information, instructions, recommendations, and/or warranties, etc. Such a means can comprise a document, digital storage media, optical storage media, audio presentation, visual display containing information. The means of communication can be a displayed web site, brochure, product label, package insert, advertisement, visual display, etc.

DESCRIPTION OF SOME EMBODIMENTS OF THE INVENTION

The inventors herein show for the first time that a natural antioxidant combination including tocopherols is surprisingly advantageous compared to tocopherols only. In particular, such a combination is able to both delay fat-oxidation over time in a fat-containing composition (i.e., compared to the use of tocopherols alone as natural antioxidants) and decrease the loss of tocopherols under a physical and/or thermal treatment of a fat-containing composition.

Moreover, the inventors herein show that a natural antioxidant combination according to the invention does not negatively impact the palatability of pet foods to cats and dogs, compared to the use of tocopherols alone. More particularly, the inventors show that a natural antioxidant combination can enhance food palatability to pets compared to the use of tocopherols alone, in particular palatability to dogs.

Antioxidant Combination

In a first aspect, the present invention concerns an antioxidant combination of at least tocopherols, carnosic acid and hydrolysable gallotannins, wherein:
  the amount of tocopherols is less than about 500 ppm, preferably less than 500 ppm and
  the ratio of carnosic acid:hydrolysable gallotannins ranges from about 1:4 to about 3:1, preferably from 1:4 to 3:1.

This antioxidant combination thus contains, in addition to tocopherols, carnosic acid and hydrolysable gallotannins. The pet food industry is currently concerned about the use of natural antioxidants such as carnosic acid, in particular when provided by rosemary, because of their potential negative influence on food palatability to pets. However, the inventors herein show that a natural antioxidant combination according to the invention does not negatively impact the palatability of pet foods to cats and dogs, compared to the use of tocopherols alone. The inventors even show that a natural antioxidant combination can enhance palatability compared to the use of tocopherols alone, in particular palatability to dogs.

In a particular embodiment, tocopherols are natural mixed tocopherols. As mentioned above, natural mixed tocopherols are a combination of alpha-tocopherols, beta-tocopherols, gamma-tocopherols and delta-tocopherols. Preferably, said natural mixed tocopherols comprise from about 7% to about 20% of alpha-tocopherols, from about 1% to about 7% of beta-tocopherols, from about 50% to about 80% of gamma-tocopherols and from about 10% to about 30% of delta-tocopherols. The use of natural tocopherols avoids the addition of synthetic or modified products, which are negatively perceived by the public. Moreover, the inventors observed a more efficient fat antioxidation when using mixed forms of tocopherols compared to the use of a single form of tocopherols.

In a preferred embodiment, carnosic acid is from rosemary.

In a preferred embodiment, hydrolysable gallotannins are gallic acid and/or tannic acid. In a particular embodiment, hydrolysable gallotannins are gallic acid.

In a preferred embodiment, the antioxidant combination contains more than 3 ppm of carnosic acid, more preferably more than 5 ppm of carnosic acid. Indeed, no significant effect is observed when carnosic acid is present in very low amounts. In a particular embodiment, the antioxidant combination contains more than 10 ppm of carnosic acid, more preferably more than 20 ppm of carnosic acid, yet more preferably more than 30 ppm of carnosic acid, and even more preferably more than 40 ppm of carnosic acid.

In a preferred embodiment, the antioxidant combination contains more than 3 ppm of gallic acid, more preferably more than 5 ppm of gallic acid. Indeed, no significant effect is observed when gallic acid is present in very low amounts. In a particular embodiment, the antioxidant combination contains more than 10 ppm of gallic acid, more preferably more than 15 ppm of gallic acid.

Preferably, the ratio of carnosic acid:hydrolysable gallotannins of the combination ranges from 1:3 to 3:1, more preferably from 1:3 to 2:1. Indeed, the fat antioxidation is still enhanced when using these preferred ratios compared to tocopherols alone.

In a particular embodiment, the antioxidant combination contains more than 3 ppm, more preferably more than 5 ppm of tocopherols.

In a particular embodiment, an antioxidant combination of the invention is a combination of tocopherols, carnosic acid and hydrolysable gallotannins. In other terms, tocopherols, carnosic acid and hydrolysable gallotannins are the only antioxidants of the combination.

Advantageously, an antioxidant combination according to the invention further comprises at least one antioxidant selected from hydroxytyrosol and quercetin.

In a particular embodiment, an antioxidant combination according to the invention further comprises at least quercetin.

In a particular embodiment, an antioxidant combination of the invention is a combination of tocopherols, carnosic acid, hydrolysable gallotannins and quercetin. In other terms, tocopherols, carnosic acid, hydrolysable gallotannins and quercetin are the only antioxidants of the combination.

Advantageously, quercetin is in an amount inferior to about 150 ppm, preferably inferior to 150 ppm. Indeed, the inventors have discovered that the period of protection observed with the combination of tocopherols, carnosic acid and hydrolysable gallotannins is significantly enhanced when quercetin is added. The addition of quercetin is particularly advantageous when not exceeding 150 ppm of quercetin. Indeed, the addition of quercetin until 150 ppm exponentially enhances the period of protection, compared to the period of protection obtained with a combination of tocopherols, carnosic acid and hydrolysable gallotannins, whereas the addition of more than 150 ppm results in a decrease of the period of protection compared to the addition of about 150 ppm of quercetin.

More preferably, quercetin is in an amount ranging from 2 ppm to 150 ppm, more preferably from 5 ppm to 150 ppm. Indeed, no significant effect is observed if quercetin is present in the antioxidant composition in negligible amounts.

In a particular embodiment, an antioxidant combination according to the invention further comprises at least hydroxytyrosol.

In a particular embodiment, an antioxidant combination of the invention is a combination of tocopherols, carnosic acid, hydrolysable gallotannins and hydroxytyrosol. In other terms, tocopherols, carnosic acid, hydrolysable gallotannins and hydroxytyrosol are the only antioxidants of the combination.

In a preferred embodiment, hydroxytyrosol is from olive extract.

Advantageously, hydroxytyrosol is in an amount superior to about 50 ppm, preferably superior to 50 ppm. Indeed, the inventors have discovered that the period of protection of the combination of tocopherols, carnosic acid and hydrolysable gallotannins is significantly enhanced when hydroxytyrosol is added. The addition of hydroxytyrosol is particularly advantageous when more than 50 ppm of hydroxytyrosol is added, the period of protection being exponentially enhanced from this 50 ppm value Advantageously, an antioxidant combination according to the invention further comprises at least hydroxytyrosol and quercetin.

In a particular embodiment, an antioxidant combination of the invention is a combination of tocopherols, carnosic acid, hydrolysable gallotannins, hydroxytyrosol and quercetin. In other terms, tocopherols, carnosic acid, hydrolysable gallotannins, hydroxytyrosol and quercetin are the only antioxidants of the combination.

Preferably, hydroxytyrosol is from olive extract.

Preferably, hydroxytyrosol is in an amount superior to about 50 ppm, more preferably superior to 50 ppm.

Preferably, quercetin is in an amount inferior to about 150 ppm, more preferably inferior to 150 ppm.

Advantageously, a combination according to the invention contains lipophilic antioxidants and hydrophilic antioxidants. Indeed, tocopherols and carnosic acid are lipophilic antioxidants, while hydrolysable gallotannins are hydrophilic antioxidants. Moreover, hydroxytyrosol and quercetin are hydrophilic antioxidants. These properties enable the combination to act on lipophilic products and/or hydrophilic products, as well as at the interface of a water-in-oil or oil-in-water emulsion.

Advantageously, a combination of the invention is in a powder form or in a liquid form. Thus, a particular embodiment concerns a combination of the invention, further comprising an appropriate carrier. The skilled person is able to determine appropriate carriers depending on the use, in particular depending on the form of the combination, i.e. liquid or powder, and/or on the hydrophilic or hydrophobic form of the combination.

In particular, when a combination of the invention is desired in a liquid form, an appropriate carrier in a liquid form is used, preferably selected from oils such as rapeseed oil, soya oil, sunflower oil and combinations thereof.

In particular, when a combination of the invention is desired in a powder form, an appropriate carrier in a powder form is used, preferably selected from carbohydrates, such as maltodextrin and/or cyclodextrin, and mineral or organic compounds, such as clay, silica, bentonite, and combinations thereof.

Fat-Containing Composition

In a second aspect, the present invention concerns an antioxidated fat-containing composition comprising an antioxidant combination of at least tocopherols, carnosic acid and hydrolysable gallotannins, wherein in said combination:
the amount of tocopherols is less than about 500 ppm, preferably less than 500 ppm and
the ratio of carnosic acid:hydrolysable gallotannins ranges from about 1:4 to about 3:1, preferably from 1:4 to 3:1.

As mentioned above, a combination according to the present invention can be incorporated to any fat-containing composition.

For example, a fat-containing composition is a food composition, a fat-containing food ingredient, a pharmaceutical composition, a fat-containing pharmaceutical ingredient, a cosmetic composition or a fat-containing cosmetic ingredient.

In the particular food technical field, the antioxidated fat-containing composition of the invention can either be a food composition as defined above, or a fat-containing food ingredient which may in turn be incorporated into a food composition (see FIG. 1 for details).

In a first particular embodiment, an antioxidated fat-containing composition of the invention is an antioxidated fat-containing food ingredient. In other terms, this particular embodiment concerns an antioxidated fat-containing food ingredient comprising an antioxidant combination of the invention (Product P2 in FIG. 1).

Preferably, an antioxidated fat-containing composition is an antioxidated fat-containing food ingredient (Product P2 in FIG. 1) selected from an antioxidated fat, an antioxidated palatability-enhancing composition comprising fat or an antioxidated meal comprising fat.

More particularly, said antioxidated fat-containing composition, which is an antioxidated fat-containing food ingredient, is an antioxidated fat, preferably selected from animal fat, vegetable oil or marine oil, more preferably animal fat or marine oil.

Yet more particularly, said animal fat is selected from pork fat, chicken fat, poultry fat, lamb tallow or beef tallow, and the like, as well as by-products thereof. More preferably, said animal fat is poultry fat.

Yet more particularly, said vegetable oil, is selected from canola oil, soybean oil, corn oil, olive oil, sunflower oil, linseed oil, palm oil, rapeseed oil, sesame oil, coconut oil, safflower oil, and the like, as well as by-products thereof. More preferably, said vegetable oil is sunflower oil.

Yet more particularly, said marine oil, is selected from tuna oil, sardine oil, salmon oil, herring oil, mackerel oil, sand eel oil, trout oil, tilapia oil, catfish oil, anchovy oil, fish oil, menhaden oil and the like, as well as by-products thereof. More preferably, said marine oil is salmon oil.

In particular, said antioxidated fat-containing composition, which is an antioxidated fat-containing food ingredient, is an antioxidated meal comprising fat, preferably selected from an animal meal or a vegetable meal.

In particular, said antioxidated fat-containing composition, which is an antioxidated fat-containing food ingredient, is an antioxidated palatability-enhancing composition comprising fat.

In a second particular embodiment, an antioxidated fat-containing composition of the invention is an antioxidated food composition (Products P6 to P10 in FIG. 1).

In a first alternative, said antioxidated food composition is a food composition (Product P3 in FIG. 1) which has been antioxidated with an antioxidant combination of the invention (Product P7 in FIG. 1). In other terms, the antioxidated properties of said antioxidated food composition are obtained with an antioxidant combination of the invention directly incorporated into a food composition.

In a second alternative, said antioxidated food composition of the invention is a food composition which has been antioxidated with one or more antioxidated fat-containing food ingredient(s) (Product P6 in FIG. 1). In other terms, the antioxidated properties of said antioxidated food composition are obtained with one or more antioxidated fat-containing food ingredient(s) incorporated into a food composition.

In a third alternative, said antioxidated food composition of the invention is a (yet) antioxidated food composition, the antioxidation of which having been maintained with one or more antioxidated fat-containing food ingredient(s) (Product P8 in FIG. 1). In other terms, the antioxidated properties of said antioxidated food composition are maintained with one or more antioxidated fat-containing food ingredient(s), incorporated into an antioxidated food composition.

In a fourth alternative, an antioxidated food composition of the invention is a food composition which has been antioxidated with one or more fat-excluding food ingredient(s) combined with an antioxidant combination of the invention (Product P9 in FIG. 1). In other terms, the antioxidated properties of said antioxidated food composition are obtained with an antioxidant combination of the invention combined with one or more fat-excluding food ingredient(s), altogether being incorporated into a food composition.

In a fifth alternative, said antioxidated food composition of the invention is a (yet) antioxidated food composition, the antioxidation of which having been maintained with one or more antioxidated fat-containing food ingredient(s) (Product P10 in FIG. 1). In other terms, the antioxidated properties of said antioxidated food composition are maintained with one or more antioxidated fat-containing food ingredient(s), incorporated into an antioxidated food composition.

Preferably, said antioxidated food composition is an extruded, antioxidated food composition.

More preferably, said antioxidated food composition is a coated, extruded, antioxidated food composition.

For all of these particular embodiments, a food composition is preferably a pet food composition.

Method for Preparing an Antioxidated Fat-Containing Composition/Method for Enhancing the Antioxidant Effect of Tocopherols A further object of the invention concerns a method for enhancing the antioxidant effect of tocopherols in a fat-containing composition, comprising:

a) providing a fat-containing composition, b) incorporating a combination as above defined into said fat-containing composition, thereby obtaining an antioxidated fat-containing composition wherein fat antioxidation is enhanced.

Preferably, the ratio of carnosic acid:hydrolysable gallotannins of said combination ranges from 1:3 to 3:1, more preferably from 1:3 to 2:1. Indeed, the fat antioxidation is still enhanced when using these preferred ratios.

A further object of the invention concerns a method for preparing an antioxidated fat-containing composition, comprising:

a) providing a fat-containing composition, b) incorporating a combination as above defined into said fat-containing composition, thereby obtaining an antioxidated fat-containing composition wherein fat antioxidation is enhanced.

As mentioned above, a combination according to the present invention can be incorporated into any fat-containing composition.

For example, a fat-containing composition is a food composition, a fat-containing food ingredient, a pharmaceutical composition, a fat-containing pharmaceutical ingredient, a cosmetic composition or a fat-containing cosmetic ingredient.

In the particular food technical field and as above explained, the fat-containing composition of step a) can either be a food composition as defined above, or a fat-containing food ingredient (see FIG. 1 for details).

First, the fat-containing composition of step a) can be a food composition (Product P3 in FIG. 1), thereby obtaining at step b) an antioxidated food composition (product P7 or P9 in FIG. 1).

Preferably, said step b) is performed by inclusion.

Here, a combination of the invention can thus be directly incorporated into a food composition (Product P3 in FIG. 1), without having previously been incorporated into a food ingredient such as a fat-containing food ingredient, thereby obtaining at step b) an antioxidated food composition (Product P7 in FIG. 1). The antioxidated property of the antioxidated food composition is thus achieved here by the antioxidant combination of the invention.

Alternatively, a combination of the invention can have been previously added to a food ingredient before being incorporated at step b) into a food composition, provided that no fat is contained in this food ingredient (herein referred to as "fat-excluding food ingredient", Product P4 in FIG. 1), in order to prepare an antioxidant combination combined with a fat-excluding food ingredient (Product P5 in FIG. 1). Consequently, an antioxidated food composition is obtained at step b) (Product P9 in FIG. 1). The antioxidated property of the antioxidated food composition is thus achieved here by the antioxidant combination of the invention, here combined with a fat-excluding food ingredient.

This alternative can be performed for example by mixing a combination of the invention with a fat-excluding food ingredient, such as one or more nutrients preferably selected from vitamins, minerals and/or electrolytes.

Secondly, a fat-containing composition of step a) is a fat-containing food ingredient (Product P1 in FIG. 1), as above defined, thereby obtaining at step b) an antioxidated fat-containing food ingredient (Product P2 in FIG. 1). The antioxidated property of the antioxidated fat-containing food ingredient is thus achieved here by the antioxidant combination of the invention.

Advantageously, said method can further comprise a step c1) of including said antioxidated fat-containing food ingredient (Product P2 in FIG. 1) into a food composition, thereby obtaining an antioxidated food composition.

Here, said food composition is either a food composition (Product P3 in FIG. 1) or, advantageously, a (yet) antioxidated food composition (Product P7 or Product P9 in FIG. 1), thereby obtaining an antioxidated food composition (Product P6, P8 or P10 in FIG. 1). The antioxidated property of the antioxidated food composition is thus achieved (or maintained) here by the antioxidated fat-containing food ingredient.

The obtained antioxidated food composition (Product P6, P7, P8, P9 or P10 in FIG. 1) can be a food preparation which can be further processed, in particular with a physical and/or thermal treatment. As above explained, the loss of tocopherols occurring under physical and/or thermal treatment is compensated by using an antioxidant combination of the invention. For example, the thus obtained antioxidated food composition can be retorted or extruded.

As an example, the obtained antioxidated food composition (Product P6, P7, P8, P9 or P10 in FIG. 1) can be a pet food preparation, further subjected to a retorting in order to obtain a wet pet food composition.

Alternatively, the method of the present invention can comprise a step c2) of extruding said antioxidated food composition (Product P6, P7, P8, P9 or P10 in FIG. 1), thereby obtaining an extruded, antioxidated food composition (Product P11, P12, P13, P14 or P15 in FIG. 1). As an example, the obtained antioxidated food composition (Product P6, P7, P8, P9 or P10 in FIG. 1) can be a pet food preparation, further subjected to a step c2) of extrusion in order to obtain a dry extruded kibble or a dry extruded pellet.

In particular, said steps c1) and c2) can be performed simultaneously or successively.

In a first alternative, an antioxidated fat-containing food ingredient can be included into a food composition, preferably an antioxidated food composition, prior to extrusion of said food composition.

In a second alternative, an antioxidated fat-containing food ingredient can be included into a food composition, preferably an antioxidated food composition, during extrusion of said food composition.

Advantageously, said method further comprises a step c3) of coating the antioxidated fat-containing composition of step b) onto an extruded food composition, thereby obtaining a coated, extruded, antioxidated food composition.

Here, said food composition is either an extruded food composition (Product P16 in FIG. 1) or, advantageously, a (yet) antioxidated food composition (Product P11, P12, P13, P14 or P15 in FIG. 1), thereby obtaining a coated, extruded, antioxidated food composition (Product P17, P18, P19, P20, P21 or P22 in FIG. 1). The antioxidated property of the antioxidated food composition is thus achieved (or maintained) here by the antioxidated fat-containing food ingredient.

As an example, the extruded food composition (Product P11, P12, P13, P14, P15 or P16) can be a dry extruded kibble or a dry extruded pellet, further subjected to a step c3) of coating in order to obtain a dry extruded kibble or a dry extruded pellet coated with an antioxidated fat-containing food ingredient, such as an antioxidated palatability-enhancing composition and/or an antioxidated fat of the invention.

Preferably, the total amount of antioxidants of the combination as above defined is up to about 1500 ppm, preferably up to 1500 ppm, preferably up to about 1300 ppm, preferably up to 1300 ppm, preferably from 700 to 1300 ppm, preferably from 700 to 1300 ppm.

Said particular embodiments are clearly combinable. For example one or more antioxidated fat-containing food ingredients can be added by inclusion and/or by coating in food composition, in particular an antioxidated food composition (which was advantageously previously incorporated with a combination of the invention).

Preferably, the technical features of a combination of the present invention are still obtained in the final antioxidated food composition. Thus, it is preferred that the total amount of tocopherols is less than about 500 ppm, preferably less than 500 ppm, and that the ratio of carnosic acid:hydrolysable gallotannins ranges from about 1:4 to about 3:1, preferably from 1:4 to 3:1, in the antioxidated food composition.

Uses

As above mentioned, an antioxidant combination of the invention can be used for enhancing the antioxidant effect of tocopherols in a fat-containing composition, said antioxidant combination having a ratio of carnosic acid:hydrolysable gallotannins ranging from 1:3 to 3:1, more preferably from 1:3 to 2:1.

Indeed, the inventors herein show for the first time that a natural antioxidant combination including tocopherols is surprisingly advantageous compared to tocopherols only. In particular, such a combination is able to both delay fat-oxidation over time in a fat-containing composition (i.e., compared to the use of tocopherols alone as natural antioxidants) and decrease the loss of tocopherols under a physical and/or thermal treatment of a fat-containing composition.

More particularly, the present invention thus relates to the use of an antioxidant combination for delaying fat-oxidation over time in a fat-containing composition and/or decreasing the loss of tocopherols under a physical and/or thermal treatment of said fat-containing composition.

Kit

Another aspect of the present invention concerns a kit comprising, in one or more containers in a single package:
- one or more fat-containing compositions as above defined; and
- an antioxidant combination according to the present invention.

More particularly, a kit can comprise in one or more containers in a single package:
- one or more pet food ingredients, wherein said one or more pet food ingredients comprise at least one fat-containing pet food ingredient as above defined; and
- an antioxidant combination according to the present invention.

Particular kits according to the present invention further comprise a means for communicating information or instructions, to help using the kits' elements.

EXAMPLES

1. Materials and Methods
1.1. Preparation of Combinations of Antioxidants
1.1.1. Antioxidants Tocopherols were provided in the form of a liquid extract containing about 70% of tocopherols (Guardian™ T-70 IP, Danisco) or in the form of a powder containing about 35% of tocopherols, prepared from a liquid extract (Decanox MTS-70, ADM, containing about 70% of tocopherols). The ratio of tocopherol isomers in the liquid extract containing about 70% of tocopherols (Guardian™ T-70 IP, Danisco) was at follows: about 15% of alpha-tocopherols, about 2% of beta-tocopherols, about 60% of gamma-tocopherols and about 23% of delta-tocopherols. The ratio of tocopherol isomers in the powder extract containing about 35% of tocopherols (Decanox MTS-70, ADM) was at follows: about 10% of alpha-tocopherols, about 2% of beta-tocopherols, about 68% of gamma-tocopherols and about 20% of delta-tocopherols.

Carnosic acid (CA) was provided in the form of a liquid extract containing about 10% of carnosic acid and carnosol (Liquid Rosemary Extract on Rapeseed oil, E392, Robertet) or in the form of a powder containing about 10% of carnosic acid and carnosol (Herbor P31, Robertet).

Hydrolysable gallotannins were provided in the form of a powder extract of gallic acid (GA) obtained from gallnut and containing about 99% of gallic acid (*Gallo chinensis* extract, Wuhu Tianci Fine Chemical Limited) or in the form of a powder extract of tannic acid (TA) obtained from gallnut and containing about 96% of tannic acid obtained from *Quercus infectoria*, (Tana102, Ajinomoto).

Quercetin was provided in the form of a powder extract obtained from *Dimorphandra mollis* or Larch and containing about 95% of dihydroquercetin (Dihydroquercetin, Quimdis).

Hydroxytyrosol was provided in the form of a liquid extract obtained from olive extract and containing about 28% of hydroxytyrosol and derivatives as tyrosol (Hytolive syrup, PL Thomas).

1.1.2. Preparation of Combinations of Antioxidants with Liquid Carrier

Combinations of antioxidants were prepared by mixing them into a powder form or liquid form, and by adding an appropriate liquid carrier, sunflower oil.

In particular, antioxidant combinations according to the invention were prepared by mixing tocopherols, carnosic acid and hydrolysable gallotannins with sunflower oil.

Comparative combinations of antioxidants were prepared by mixing tocopherols, carnosic acid, hydrolysable gallotannins, with sunflower oil, without respecting the essential and minimal combination of the invention, i.e. tocopherols, carnosic acid and hydrolysable gallotannins.

These combinations were used in the examples 1, 7-9.

1.1.3. Preparation of Combinations of Antioxidants with Powder Carrier

Combinations of antioxidants were prepared by mixing them into a powder form or liquid form, and by adding an appropriate carrier, bentonite.

In particular, antioxidant combinations according to the invention were prepared by mixing tocopherols, carnosic acid and hydrolysable gallotannins, and optionally quercetin and/or hydroxytyrosol with bentonite.

Comparative combinations of antioxidants were prepared by mixing tocopherols, carnosic acid, hydrolysable gallotannins, with bentonite, without respecting the essential and minimal combination of the invention, i.e. tocopherols, carnosic acid and hydrolysable gallotannins.

These combinations were used in the examples 2-6.

1.2. Preparation of Fat-Containing Compositions Comprising Antioxidants
1.2.1. Preparation of Fats Comprising Antioxidants Fats comprising antioxidants were prepared by mixing combinations of antioxidants as obtained at Example 1.1.2 or by mixing an antioxidant alone into fats. Among these products, fats comprising at least tocopherols (Guardian™ T-70 IP, Danisco), carnosic acid (Liquid Rosemary extract, Robertet) and hydrolysable gallotannins (Gallic acid from *Gallo chinensis*, Wuhu Tianci Fine Chemical Limited; tannic acid from *Quercus infectoria*: Tana102, Ajinomoto) are fat-containing compositions according to the invention.

Two different fats were used: poultry fat (provided by Diana Food, France) and salmon oil (provided by Daudruy, France).

1.2.2. Preparation of Pet Food Compositions Comprising Antioxidants Added by Coating Pet food compositions in the form of nutritionally-balanced dry kibbles suitable for consumption by pets and obtained after an extrusion and drying process were prepared.

Fats comprising antioxidants as obtained at Example 1.2.1 were added by coating at 6% onto these dry kibbles. Among these products, dry kibbles coated with at least tocopherols, carnosic acid and hydrolysable gallotannins are food compositions, i.e. pet food compositions, according to the invention.

Pet food compositions thus obtained were stored at 50° C.

1.2.3. Preparation of Pet Foods Comprising Antioxidants Incorporated by Inclusion Pet food compositions in the form of nutritionally-balanced dry kibbles suitable for consumption by pets were prepared.

Combinations of antioxidants as obtained at Example 1.1.3 were incorporated with the premix, i.e. vitamins, minerals and electrolytes, in a double-ribbon mixer, the resulting blends underwent, with other pet food ingredients, pre-conditioning, extrusion and drying process.

Among these products, the dry kibbles in which at least tocopherols, carnosic acid and hydrolysable gallotannins were included are fat-containing compositions according to the invention.

Pet food compositions thus obtained were stored at 50° C.

1.3. Determination of Hexanal Value of Pet Food Compositions Comprising Antioxidants Added by Coating Pet food compositions as obtained at Example 1.2.2 were analyzed so as to determine the hexanal value. To this end, kibbles were crushed and an extraction was performed by static head-space in water at 90° C. with deutered hexanal. A separation by gas chromatography on a polar column and detection and quantification were performed by mass spectrometry (SIM).

1.4. Determination of Peroxide Value of Pet Food Compositions Comprising Antioxidants Added by Coating Pet food compositions as obtained at Example 1.2.2 were analyzed so as to determine the peroxide value. A fat extraction was performed according to NFV03-030 and peroxide value was determined according to NF EN ISO 3960 (Version of June 2010).

1.5. Determination of Hexanal Value of Pet Food Composition Comprising Antioxidants Incorporated by Inclusion Pet food compositions as obtained at Example 1.2.3 were analyzed so as to determine the hexanal value according to AOCS method Cg 4-94 (AOCS. 1997). 1.6. Determination of Peroxide Value of Pet Food Composition Comprising Antioxidants Incorporated by Inclusion Pet food compositions as obtained at Example 1.2.3 were analyzed so as to determine the peroxide value. A fat extraction was performed and peroxide value was determined according to AOCS Official Method Cd 8b-90.

1.7. Calculation of Total Hexanal Value and Peroxide Value Released During a Determined Period The hexanal value and peroxide value were measured at different times after preparation of the diets.

1.8. Calculation of Total Hexanal Value and Peroxide Value Released During a Determined Period The hexanal value and peroxide value were measured at different times after preparation of the diets. For example, "hexanal value at 14 weeks" refers to the hexanal value measured at 14 weeks.

"Total hexanal value" or "total peroxide value" refers to the total amount of hexanal or peroxide released during the studies, based on the areas under the curves representing hexanal value or peroxide value (measured at different periods of time during storage) in function of time.

1.9. Determination of the Time Period of Protection

The time protection was determined by using a Rancimat (743 Rancimat, Metrohm). 3 mL of fats comprising antioxidants were prepared at Example 1.2.1. are introduced in Rancimat's reactors and a heat treatment was performed at 110° C. for poultry fat and 80° C. for salmon oil. Based on conductimetric measurement, a direct evaluation of formation of oxidation products by the Rancimat was made. Induction period is automatically evaluated once conductimetry is over a certain value.

1.10. Palatability Tests

Principle of the Two-Bowl Test:

The test is based on the postulate whereby the more food consumed, the more palatable it is.

Individual versus (Two bowls) palatability tests, based on the comparison between two foods, were carried out. Tests are performed either on panel of 36 dogs or on panel of 40 cats, depending on the test's objectives.

Operating Method of the Test:

Identical amounts of food A and food B were weighed out and placed in identical bowls. The amount present in each ration enables the daily requirements to be met.

Distribution of the bowls:

Dog test: the bowls were placed in an individual feed trough accessible to dogs.

Cat test: The bowls were presented at the same time to each cat in an individual loose box and their positions were switched at each meal to avoid a choice led by handedness.

Duration of the test:

Cat test: from about 15 minutes to about 20 hours (if one of the two bowls was entirely eaten before the end of the test, the two bowls were removed, and the test was stopped);

Dog test: from about 15 minutes to about 30 minutes (if one of the two bowls was entirely eaten before the end of the test, the two bowls were removed, and the test was stopped).

Parameters Studied

Measured parameters: First food consumed ("initial appeal") and amount of each food consumed by the end of the test;

Calculated parameters: individual consumption ratio in % (CR)

$CRA$=consumption of A (g)×100/(consumption of A+B) (g)

$CRB$=consumption of B (g)×100/(consumption of A+B) (g);

Average consumption ratio (ACR)=average of all individual ratios (an equal importance is given to each animal, regardless of its size and of its corresponding consumption).

If animals have higher or lower consumption compared to predetermined values (which are function of, e.g., the animal weight and/or metabolism), they are not taken into account into statistical treatment.

Statistical Analysis:

Statistical analysis was used to determine if there was a significant difference between the 2 ratios. A Student's t-test with 3 error thresholds, namely 5%, 1% and 0.1%, was performed.

A Chi-square test was used to determine if there was a significant difference between the number of pets with Food A as first food eaten and the number of pets with Food B as first food eaten.

Significance levels are noted as below:

| | | |
|---|---|---|
| NS | not significant | (p > 0.05) |
| * | significant | (p < 0.05) |
| ** | highly significant | (p < 0.01) |
| *** | very highly significant | (p < 0.001) |

2. Results

For all the following examples, experimental diets are diets comprising an antioxidant combination of the present invention and comparative diets are diets which do not comprise an antioxidant combination of the present invention.

2.1. Example 1—Effect of a Combination of the Invention Added by Coating onto an Extruded Pet Food Composition on the Hexanal Value and on the Peroxide Value Nutritionally-balanced dry kibbles, herein referred to as "VV", were prepared according to Example 1.2.2 by coating poultry fat (6%) comprising antioxidants onto dry kibbles "VV".

Table 1 below shows the type and amounts of antioxidant(s) used into the poultry fat.

TABLE 1

| Composition | Tocopherols | Carnosic Acid | Hydrolysable gallotannins | Quercetin | Hydroxytyrosol |
|---|---|---|---|---|---|
| Comparative Diet no1 | 0 | 100 ppm | 0 | 0 | 0 |
| Comparative Diet no2 | 0 | 0 | 200 ppm | 0 | 0 |
| Comparative Diet no3 | 500 ppm | 0 | 0 | 0 | 0 |
| Comparative Diet no4 | 0 | 0 | 0 | 200 ppm | 0 |
| Comparative Diet no5 | 0 | 0 | 0 | 0 | 200 ppm |
| Comparative Diet no6 | 500 ppm | 100 ppm | 0 | 0 | 0 |
| Comparative Diet no7 | 500 ppm | 0 | 200 ppm | 0 | 0 |
| Experimental Diet no1 | 500 ppm | 100 ppm | 200 ppm | 0 | 0 |
| Comparative Diet no8 | 500 ppm | 100 ppm | 0 | 200 ppm | 0 |
| Experimental Diet no2 | 500 ppm | 100 ppm | 200 ppm | 200 ppm | 200 ppm |
| Experimental Diet no3 | 500 ppm | 100 ppm | 200 ppm | 0 | 200 ppm |

In table 2 below, HV 10 weeks (in ppm) and PV 10 weeks (meq/kg fat) respectively correspond to the HV value and the PV value measured precisely 10 weeks after the preparation of the diets, while total HV 10 weeks (in ppm) or total PV 10 weeks (meq/kg fat) respectively correspond to the total amount of hexanal and peroxide released from the preparation of the diets until 10 weeks.

As shown in Table 2 below, the combination of only one of carnosic acid or hydrolysable gallotannins with tocopherols, provides higher hexanal value (HV) and peroxide value (PV), compared with the combination of tocopherols with both of hydrolysable gallotannins and carnosic acid (see Comparative Diets 7, 8 compared with Experimental Diet 1). This demonstrates the interest of having a combination of tocopherols with both of hydrolysable gallotannins and carnosic acid.

The lower hexanal and peroxide values are obtained with Experimental diet no 2, a combination of tocopherols, hydrolysable gallotannins, carnosic acid and hydroxytyrosol (for example compared to Experimental diet no 1), showing the interest of adding hydroxytyrosol.

Moreover, it is shown that the use of quercetin alone provides lower hexanal value and peroxide value than the use of tocopherols alone (see Comparative Diet no 4 compared with Comparative Diet no 3). However, when combined with carnosic acid and hydrolysable gallotannins, tocopherols provide much lower hexanal value and peroxide value than quercetin (see Experimental Diet no 1 compared with Comparative Diet no 8). This demonstrates the interesting combined effect of tocopherols, hydrolysable gallotannins and carnosic acid.

TABLE 2

| | HV 10 weeks | PV 10 weeks | Total HV 10 weeks | Total PV 10 weeks |
|---|---|---|---|---|
| Comparative Diet no1 | 9 | 21.4 | 55 | 187 |
| Comparative Diet no2 | 43 | 113 | 99 | 267 |
| Comparative Diet no3 | 54 | 81.5 | 118 | 250 |

TABLE 2-continued

| | HV 10 weeks | PV 10 weeks | Total HV 10 weeks | Total PV 10 weeks |
|---|---|---|---|---|
| Comparative Diet no4 | 24 | 66.9 | 72 | 222 |
| Comparative Diet no5 | 58 | 143 | 113 | 294 |
| Comparative Diet no6 | 11 | 20 | 70 | 202 |

TABLE 2-continued

| | HV 10 weeks | PV 10 weeks | Total HV 10 weeks | Total PV 10 weeks |
|---|---|---|---|---|
| Comparative Diet no7 | 33 | 73 | 88 | 220 |
| Experimental Diet no1 | 12 | 31.4 | 59 | 189 |
| Comparative Diet no8 | 40 | 106 | 104 | 215 |
| Experimental Diet no2 | 11 | 43 | 56 | 210 |
| Experimental Diet no3 | 1 | 11 | 40 | 184 |

2.2. Example 2—Effect on the Hexanal Value of an Antioxidant Combination of the Invention, Compared Either to Tocopherols Alone or to Antioxidant Combination Out of the Invention (i.e. with a Ratio CA:GA of 4:1), Incorporated into an Extruded Pet Food Composition by Inclusion Nutritionally-balanced dry kibbles, herein referred to as "WW", were prepared according to Example 1.2.3 by incorporating antioxidants into dry kibbles "WW" by inclusion. 50 ppm of tocopherols was included into all of the diets.

Comparative Diet no 9 was "WW" including 50 ppm of tocopherols.

Experimental Diet no 4 was "WW" including 50 ppm of tocopherols, 40 ppm of carnosic acid (CA) and 40 ppm of hydrolysable gallotannins (GA) (ratio CA:GA of 1:1).

Experimental Diet no 5 was "WW" including 50 ppm of tocopherols, 80 ppm of carnosic acid and 40 ppm of hydrolysable gallotannins (ratio CA:GA of 2:1).

Experimental Diet no 6 was "WW" including 50 ppm of tocopherols, 120 ppm of carnosic acid and 40 ppm of hydrolysable gallotannins (ratio CA:GA of 3:1).

Comparative Diet no 10 was "WW" including 50 ppm of tocopherols, 160 ppm of carnosic acid and 40 ppm of hydrolysable gallotannins (ratio CA:GA of 4:1).

As shown in Table 3 below, the hexanal value (HV) measured after 14 weeks of storage at 50° C., obtained using a combination of tocopherols with carnosic acid and hydrolysable gallotannins in a ratio from 1:1 to 3:1 was at least equivalent, and may be even lower, compared to the hexanal value obtained using tocopherols alone. However, when combining tocopherols with carnosic acid and hydrolysable gallotannins at a ratio CA:GA out of the ratio according to the present invention, the hexanal value measured into the dry kibbles was significantly higher than when using tocopherols alone. These results clearly show that a combination of tocopherols with carnosic acid and hydrolysable gallotannins can enhance the antioxidant effect of tocopherols, by decreasing the hexanal value (or by at least stabilizing it) with the provision of not using a ratio carnosic acid:hydrolysable gallotannins out of the range of the present invention.

TABLE 3

| Composition | HV at 14 weeks (ppm) | Standard deviation (5%) | |
|---|---|---|---|
| Comparative Diet no9 (50 ppm tocos) | 26.96 | 25.61 | 28.31 |
| Experimental Diet no4 (50 ppm tocopherols, 40 ppm CA, 40 ppm GA (ratio 1:1)) | 18.97 | 18.02 | 19.92 |

TABLE 3-continued

| Composition | HV at 14 weeks (ppm) | Standard deviation (5%) | |
|---|---|---|---|
| Experimental Diet no5 (50 ppm tocopherols, 80 ppm CA, 40 ppm GA (ratio 2:1)) | 20.60 | 19.57 | 21.63 |
| Experimental Diet no6 (50 ppm tocopherols, 120 ppm CA, 40 ppm GA (ratio 3:1)) | 26.85 | 25.51 | 28.20 |
| Comparative Diet no10 (50 ppm tocopherols, 160 ppm CA, 40 ppm GA (ratio 4:1)) | 37.75 | 35.86 | 39.64 |

2.3. Example 3—Effect on the Hexanal Value of an Antioxidant Combination of the Invention, Compared Either to Tocopherols Alone or to Antioxidant Combination Out of the Invention (i.e. with a Ratio CA:GA 1:5), Incorporated into an Extruded Pet Food Composition by Inclusion Nutritionally-balanced dry kibbles, herein referred to as "WW", were prepared according to Example 1.2.3 by incorporating antioxidants into dry kibbles "WW" by inclusion. 5 ppm of tocopherols was included into all of the diets.

Comparative Diet no 11 was "WW" including 5 ppm of tocopherols.

Experimental Diet no 7 was "WW" including 5 ppm of tocopherols, 60 ppm of carnosic acid (CA) and 60 ppm of hydrolysable gallotannins (GA) (ratio CA:GA of 1:1).

Experimental Diet no 8 was "WW" including 5 ppm of tocopherols, 60 ppm of carnosic acid and 120 ppm of hydrolysable gallotannins (ratio CA:GA of 1:2).

Experimental Diet no 9 was "WW" including 5 ppm of tocopherols, 60 ppm of carnosic acid and 180 ppm of hydrolysable gallotannins (ratio CA:GA of 1:3).

Experimental Diet no 10 was "WW" including 5 ppm of tocopherols, 60 ppm of carnosic acid and 240 ppm of hydrolysable gallotannins (ratio CA:GA of 1:4).

Comparative Diet no 12 was "WW" including 5 ppm of tocopherols, 60 ppm of carnosic acid and 300 ppm of hydrolysable gallotannins (ratio CA:GA of 1:5).

As shown in Table 4 below, the hexanal value (HV) measured after 14 weeks of storage at 50° C., obtained using a combination of tocopherols with carnosic acid and hydrolysable gallotannins in a ratio from 1:1 to 1:4 was at least equivalent, and may be even lower, compared to the hexanal value obtained using tocopherols alone. However, when combining tocopherols with carnosic acid and hydrolysable gallotannins out of the ratio according to the present invention, the hexanal value measured into the dry kibbles was significantly higher than when using tocopherols alone. These results clearly show that a combination of tocopherols with carnosic acid and hydrolysable gallotannins can enhance the antioxidant effect of tocopherols, by decreasing the hexanal value (or by at least stabilizing it) with the provision of not using a ratio carnosic acid:hydrolysable gallotannins out of the ratio of the present invention.

TABLE 4

| Composition | HV at 14 weeks (ppm) | Standard deviation (5%) | |
|---|---|---|---|
| Comparative Diet no11 (5 ppm tocos) | 29.23 | 27.77 | 30.69 |
| Experimental Diet no7 (5 ppm tocopherols, 60 ppm CA, 60 ppm GA (ratio 1:1)) | 20.95 | 19.90 | 22.00 |

TABLE 4-continued

| Composition | HV at 14 weeks (ppm) | Standard deviation (5%) | |
|---|---|---|---|
| Experimental Diet no8 (5 ppm tocopherols, 60 ppm CA, 120 ppm GA (ratio 1:2)) | 20.23 | 19.22 | 21.24 |
| Experimental Diet no9 (5 ppm tocopherols, 60 ppm CA, 180 ppm GA (ratio 1:3)) | 22.71 | 21.57 | 23.85 |
| Experimental Diet no10 (5 ppm tocopherols, 60 ppm CA, 240 ppm GA (ratio 1:4)) | 28.38 | 26.96 | 29.80 |
| Comparative Diet no13 (5 ppm tocopherols, 60 ppm CA, 300 ppm GA (ratio 1:5)) | 37.25 | 35.39 | 39.11 |

2.4. Example 4—Effect on the Hexanal Value of an Antioxidant Combination of the Invention, Compared Either to Tocopherols Alone or to Antioxidant Combinations Out of the Invention (i.e. with a Ratio CA:GA of 4:1 or 1:5), Incorporated into an Extruded Pet Food Composition by Inclusion Nutritionally-balanced dry kibbles, herein referred to as "WW", were prepared according to Example 1.2.3 by incorporating antioxidants into dry kibbles "WW" by inclusion. 200 ppm of tocopherols was included into all of the diets.

Comparative Diet no 13 was "WW" including 200 ppm of tocopherols.

Experimental Diet no 11 was "WW" including 200 ppm of tocopherols, 150 ppm of carnosic acid (CA) and 50 ppm of hydrolysable gallotannins (GA) (ratio CA:GA of 3:1).

Comparative Diet no 14 was "WW" including 200 ppm of tocopherols, 200 ppm of carnosic acid and 50 ppm of hydrolysable gallotannins (ratio CA:GA of 4:1).

Experimental Diet no 12 was "WW" including 200 ppm of tocopherols, 55 ppm of carnosic acid and 220 ppm of hydrolysable gallotannins (ratio CA:GA of 1:4).

Comparative Diet no 16 was "WW" including 200 ppm of tocopherols, 55 ppm of carnosic acid and 275 ppm of hydrolysable gallotannins (ratio CA:GA of 1:5).

As shown in Table 5 below, the hexanal value (HV) measured after 14 weeks of storage at 50° C., obtained using a combination of tocopherols with carnosic acid and hydrolysable gallotannins in a ratio of 3:1 or 1:4 was at least equivalent compared to the hexanal value obtained using tocopherols alone. However, when combining tocopherols with carnosic acid and hydrolysable gallotannins out of the ratio according to the present invention, the hexanal value measured into the dry kibbles was significantly higher than when using tocopherols alone. These results clearly show that a combination of tocopherols with carnosic acid and hydrolysable gallotannins can enhance the antioxidant effect of tocopherols, by decreasing the hexanal value (or by at least stabilizing it) with the provision of not using a ratio carnosic acid:hydrolysable gallotannins out of the ratio of the present invention.

TABLE 5

| Composition | HV at 14 weeks (ppm) | Standard deviation (5%) | |
|---|---|---|---|
| Comparative Diet no13 (200 ppm tocos) | 183 | 173.85 | 192.15 |
| Experimental Diet no11 (200 ppm tocopherols, 150 ppm CA, 50 ppm GA (ratio 3:1)) | 182 | 172.9 | 191.1 |

TABLE 5-continued

| Composition | HV at 14 weeks (ppm) | Standard deviation (5%) | |
|---|---|---|---|
| Comparative Diet no14 (200 ppm tocopherols, 200 ppm CA, 50 ppm GA (ratio 4:1)) | 263 | 249.85 | 276.15 |
| Experimental Diet no12 (200 ppm tocopherols, 55 ppm CA, 220 ppm GA (ratio 1:4)) | 171 | 162.45 | 179.55 |
| Comparative Diet no15 (200 ppm tocopherols, 55 ppm CA, 275 ppm GA (ratio 1:5)) | 201 | 190.95 | 211.05 |

2.5. Example 5—Effect on the Hexanal Value of an Antioxidant Combination of the Invention, Comprising not More than 500 ppm of Tocopherols, Incorporated into an Extruded Pet Food Composition by Inclusion Nutritionally-balanced dry kibbles, herein referred to as "WW", were prepared according to Example 1.2.3 by incorporating antioxidants into dry kibbles "WW" by inclusion. 120 ppm of carnosic acid and 80 ppm of hydrolysable gallotannins (ratio CA:GA of 1.5:1) were included into all of the diets.

Comparative Diet no 16 was "WW" including only 120 ppm of carnosic acid and 80 ppm of hydrolysable gallotannins (GA).

Experimental Diet no 13 was "WW" including 5 ppm of tocopherols, 120 ppm of carnosic acid and 80 ppm of hydrolysable gallotannins (GA).

Experimental Diet no 14 was "WW" including 100 ppm of tocopherols, 120 ppm of carnosic acid and 80 ppm of hydrolysable gallotannins (GA).

Experimental Diet no 15 was "WW" including 200 ppm of tocopherols, 120 ppm of carnosic acid and 80 ppm of hydrolysable gallotannins (GA).

Experimental Diet no 16 was "WW" including 300 ppm of tocopherols, 120 ppm of carnosic acid and 80 ppm of hydrolysable gallotannins (GA).

Experimental Diet no 17 was "WW" including 400 ppm of tocopherols, 120 ppm of carnosic acid and 80 ppm of hydrolysable gallotannins (GA).

Experimental Diet no 18 was "WW" including 500 ppm of tocopherols, 120 ppm of carnosic acid and 80 ppm of hydrolysable gallotannins (GA).

Comparative Diet no 17 was "WW" including 600 ppm of tocopherols, 120 ppm of carnosic acid and 80 ppm of hydrolysable gallotannins (GA).

Figure 2:
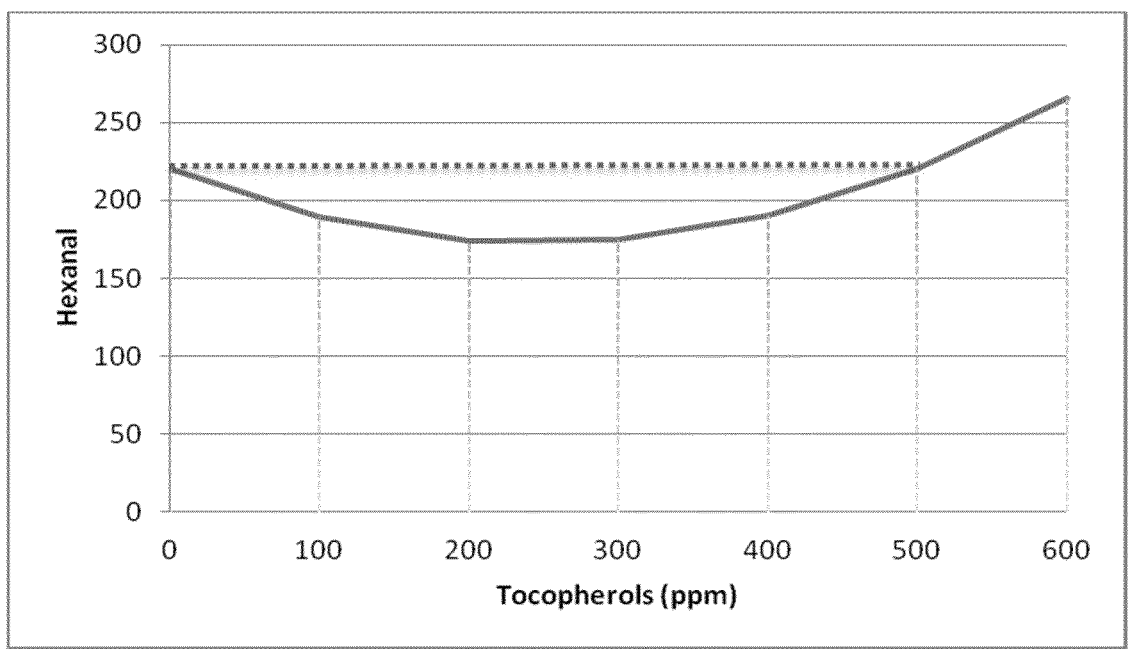
FIG. 2: Total hexanal value (ppm) released during 14 weeks of dry extruded kibbles containing 120 ppm of carnosic acid and 80 ppm of hydrolysable gallotannins and different amounts of tocopherols, added by inclusion.

As shown in FIG. 2, the use of less than 500 ppm of tocopherols with carnosic acid and hydrolysable gallotannins provides a lower total hexanal value obtained after 14 weeks at 50° C. (or equivalent) than when using only carnosic acid and hydrolysable gallotannins. When exceeding 500 ppm, the hexanal value becomes higher than when no tocopherols are used (see Comparative Diets no 16, no 17 and Experimental Diet no 18). This demonstrates that carnosic acid and hydrolysable gallotannins are useful to enhance the antioxidant effect of tocopherols provided that tocopherols are not used in an amount exceeding 500 ppm.

2.6. Example 6—Effect of a combination of the invention on the loss of tocopherols under thermal and/or physical treatment.

Nutritionally-balanced dry kibbles, herein referred to as "WW", were prepared according to Example 1.2.3 by incorporating antioxidants into dry kibbles "WW" by inclusion.

Comparative Diet no 18 was "WW" including 200 ppm of tocopherols.

Experimental Diet no 19 was "WW" including 200 ppm of tocopherols, 50 ppm of carnosic acid (CA) and 200 ppm of hydrolysable gallotannins (GA) (ratio CA:GA of 1:4).

Comparative Diet no 19 was "WW" including 200 ppm of tocopherols, 50 ppm of carnosic acid and 250 ppm of hydrolysable gallotannins (ratio CA:GA of 1:5).

Comparative Diet no 20 was "WW" including 300 ppm of tocopherols.

Experimental Diet no 20 was "WW" including 300 ppm of tocopherols, 90 ppm of carnosic acid (CA) and 30 ppm of hydrolysable gallotannins (GA) (ratio CA:GA of 3:1).

Comparative Diet no 21 was "WW" including 300 ppm of tocopherols, 120 ppm of carnosic acid and 30 ppm of hydrolysable gallotannins (ratio CA:GA of 4:1).

Comparative Diet no 22 was "WW" including 324 ppm of tocopherols.

Experimental Diet no 21 was "WW" including 324 ppm of tocopherols, 65 ppm of carnosic acid (CA) and 130 ppm of hydrolysable gallotannins (GA) (ratio CA:GA of 1:2).

Experimental Diet no 22 was "WW" including 324 ppm of tocopherols, 65 ppm of carnosic acid (CA) and 130 ppm of hydrolysable gallotannins (TA, Tannic Acid) (ratio CA:TA of 1:2).

As shown in Tables 6 and 7 below, the loss of tocopherols resulting after using a combination of tocopherols with carnosic acid and hydrolysable gallotannins in a ratio of 3:1 or 1:4 was at least equivalent compared to the loss of tocopherols obtained when using tocopherols alone. However, when combining tocopherols with carnosic acid and hydrolysable gallotannins in a ratio out of the ratio according to the present invention, the loss of tocopherols was significantly higher than when using tocopherols alone. These results clearly show that a combination of tocopherols with carnosic acid and hydrolysable gallotannins can enhance the antioxidant effect of tocopherols, by decreasing the loss of tocopherols under a physical treatment, with the provision of not using a ratio carnosic acid:hydrolysable gallotannins out of the ratio of the present invention.

TABLE 6

| Composition | Loss of tocos during extrusion (%) | Standard deviation (5%) (%) | |
|---|---|---|---|
| Comparative Diet no18 (200 ppm tocos) | 86.4 | 82.1 | 90.7 |
| Experimental Diet no19 (200 ppm tocopherols, 50 ppm CA, 200 ppm GA (ratio 1:4)) | 83.8 | 79.6 | 88.0 |
| Comparative Diet no19 (200 ppm tocopherols, 50 ppm CA, 250 ppm GA (ratio 1:5)) | 97.8 | 92.9 | 102.7 |

TABLE 7

| Composition | Loss of tocos during extrusion (%) | Standard deviation (5%) (%) | |
|---|---|---|---|
| Comparative Diet no20 (300 ppm tocos) | 87.3 | 82.1 | 90.7 |
| Experimental Diet no20 (300 ppm tocopherols, 90 ppm CA, 30 ppm GA (ratio 3:1)) | 78.5 | 74.6 | 82.4 |
| Comparative Diet no21 (300 ppm tocopherols, 120 ppm CA, 30 ppm GA (ratio 4:1)) | 101.7 | 96.6 | 106.8 |

As shown in Table 8, the use of tocopherols combined with carnosic acid and either gallic acid (Experimental Diet no 21) or tannic acid (Experimental Diet no 22) as hydrolysable gallotannins decreases the loss of tocopherols under a physical treatment compared to the use of tocopherols alone (Comparative Diet no 22). These results clearly show that a combination of tocopherols with carnosic acid and hydrolysable gallotannins, whatever the type of hydrolysable gallotannins (tannic acid or gallic acid), can enhance the antioxidant effect of tocopherols.

TABLE 8

| Composition | Loss of tocos during extrusion (%) | Standard deviation (5%) (%) | |
|---|---|---|---|
| Comparative Diet no22 (324 ppm tocos) | 86.9 | 82.6 | 91.2 |
| Experimental Diet no21 (324 ppm tocopherols, 65 ppm CA, 130 ppm GA (ratio 1:2)) | 75.3 | 71.5 | 79.1 |
| Experimental Diet no22 (324 ppm tocopherols, 65 ppm CA, 130 ppm TA (ratio 1:2)) | 69.7 | 66.2 | 73.2 |

2.7. Example 7—Effect on the Time of Protection of an Antioxidant Combination of the Invention Incorporated into a Fat Fats comprising antioxidants were prepared according to Example 1.2.1. by incorporating antioxidants into salmon oil.

Figure 3:
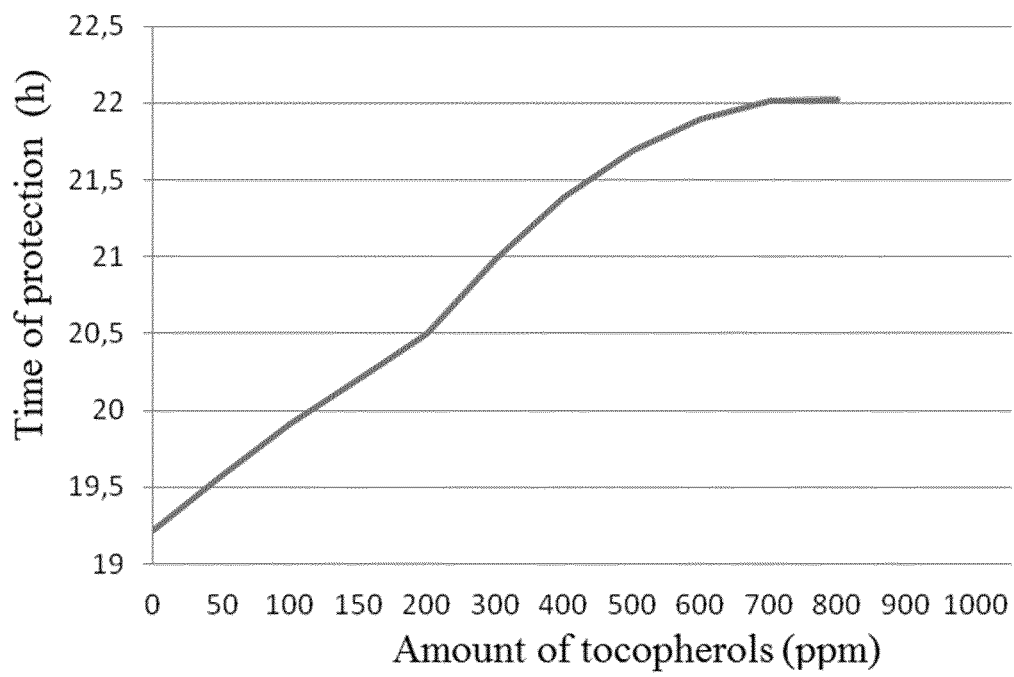
FIG. 3: Time of protection (period expressed in hours) determined on salmon oil containing 400 ppm of carnosic acid and 200 ppm of hydrolysable gallotannins (ratio CA:GA of 2:1) and different amounts of tocopherols.
Figure 4:
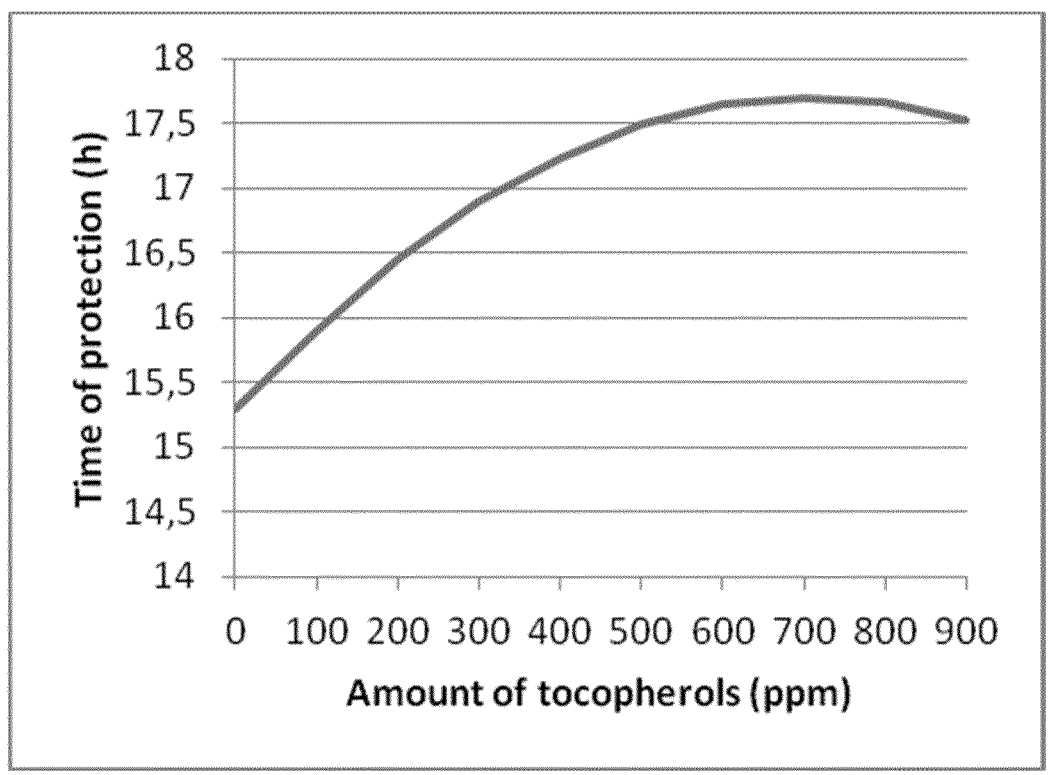
FIG. 4: Time of protection (period expressed in hours) determined on salmon oil containing 100 ppm of carnosic acid and 400 ppm of hydrolysable gallotannins (ratio CA:GA of 1:4) and different amounts of tocopherols.

The time of protection measured on the different fats is shown in FIGS. 3 and 4.

In FIG. 3, 400 ppm of carnosic acid and 200 ppm of hydrolysable gallotannins (ratio CA:GA of 2:1) were added into salmon oils, in combination or not with tocopherols, the amount of which is represented in FIG. 3.

In FIG. 4, 100 ppm of carnosic acid and 400 ppm of hydrolysable gallotannins (ratio CA:GA of 1:4) were added into salmon oils, in combination or not with tocopherols, the amount of which is represented in FIG. 4.

As shown in FIGS. 3 and 4, the use of less than 500 ppm of tocopherols with carnosic acid and hydrolysable gallotannins significantly enhances the time of protection of salmon oil compared to the use of carnosic acid and hydrolysable gallotannins only. When exceeding 500 ppm, the time of protection does not increase anymore. Therefore, it is not advantageous to add more tocopherols than 500 ppm. This demonstrates that a combination of the invention is useful to enhance the time of protection of fats, such as salmon oil, provided that tocopherols are not used in an amount exceeding 500 ppm. 2.8. Example 8—Effect on the Time of Protection of a Combination of the Invention Comprising Quercetin and Incorporated into a Fat Fats comprising antioxidants were prepared according to Example 1.2.1. by incorporating antioxidants into poultry fat.

The time of protection measured on the different fats is shown in FIGS. 5 to 8.

Figure 5:
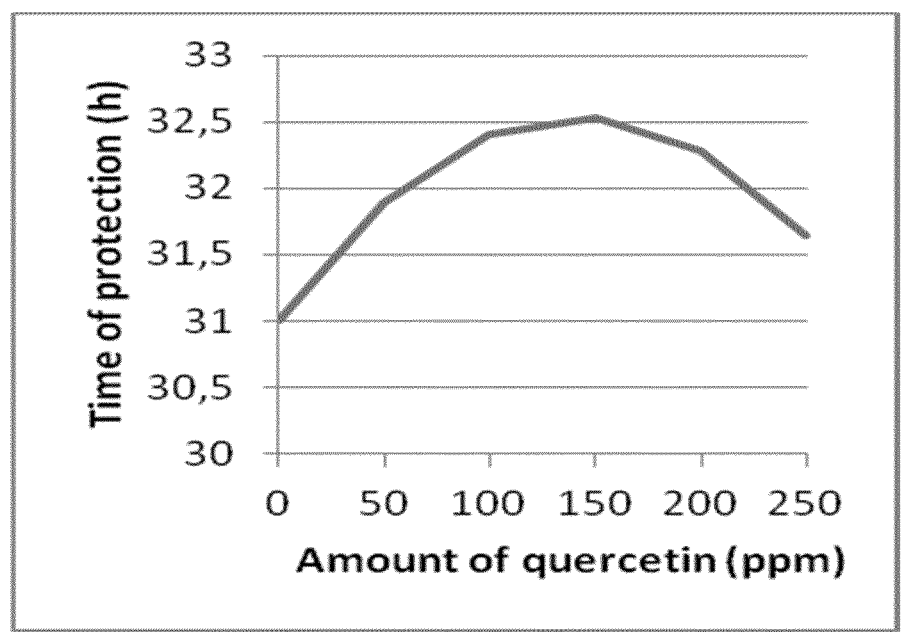
FIG. 5: Time of protection (period expressed in hours) determined on poultry fat containing 400 ppm of tocopherols, 50 ppm of carnosic acid and 100 ppm of hydrolysable gallotannins (ratio CA:GA of 1:2) and different amounts of quercetin.

In FIG. 5, 400 ppm of tocopherols, 50 ppm of carnosic acid and 100 ppm of hydrolysable gallotannins (ratio CA:GA of 1:2) were added into poultry fats, in combination or not with quercetin, the amount of which is represented in FIG. 5.

Figure 6:
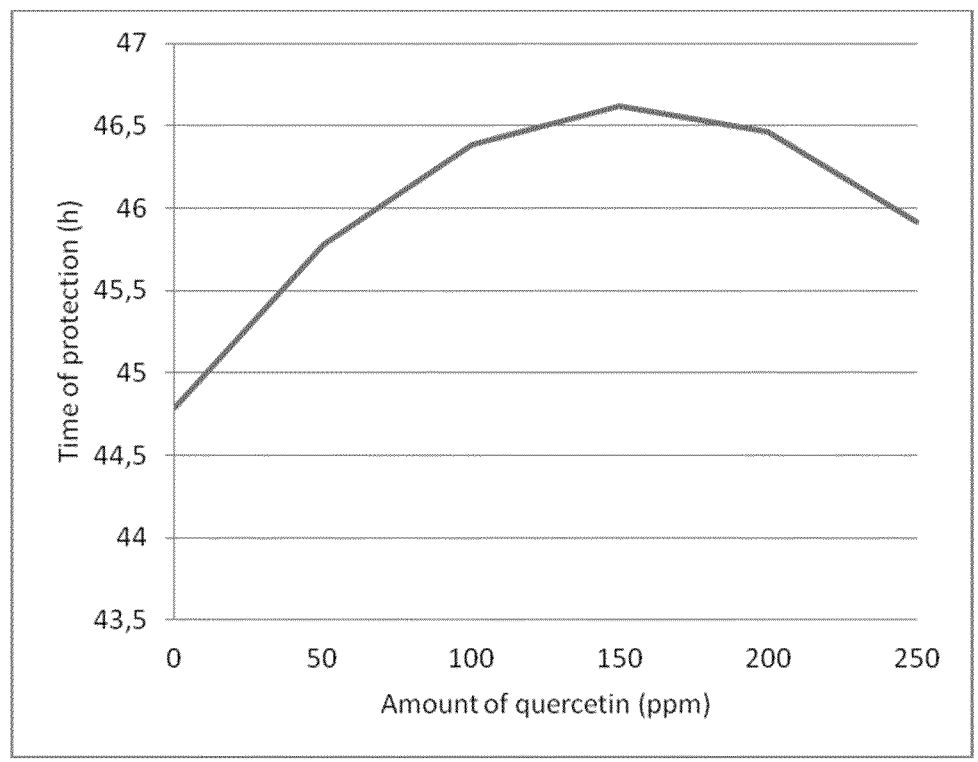
FIG. 6: Time of protection (period expressed in hours) determined on poultry fat containing 400 ppm of tocopherols, 100 ppm of carnosic acid and 400 ppm of hydrolysable gallotannins (ratio CA:GA of 1:4) and different amounts of quercetin.

In FIG. 6, 400 ppm of tocopherols, 100 ppm of carnosic acid and 400 ppm of hydrolysable gallotannins (ratio CA:GA of 1:4) were added into poultry fats, in combination or not with quercetin, the amount of which is represented in FIG. 6.

Figure 7:
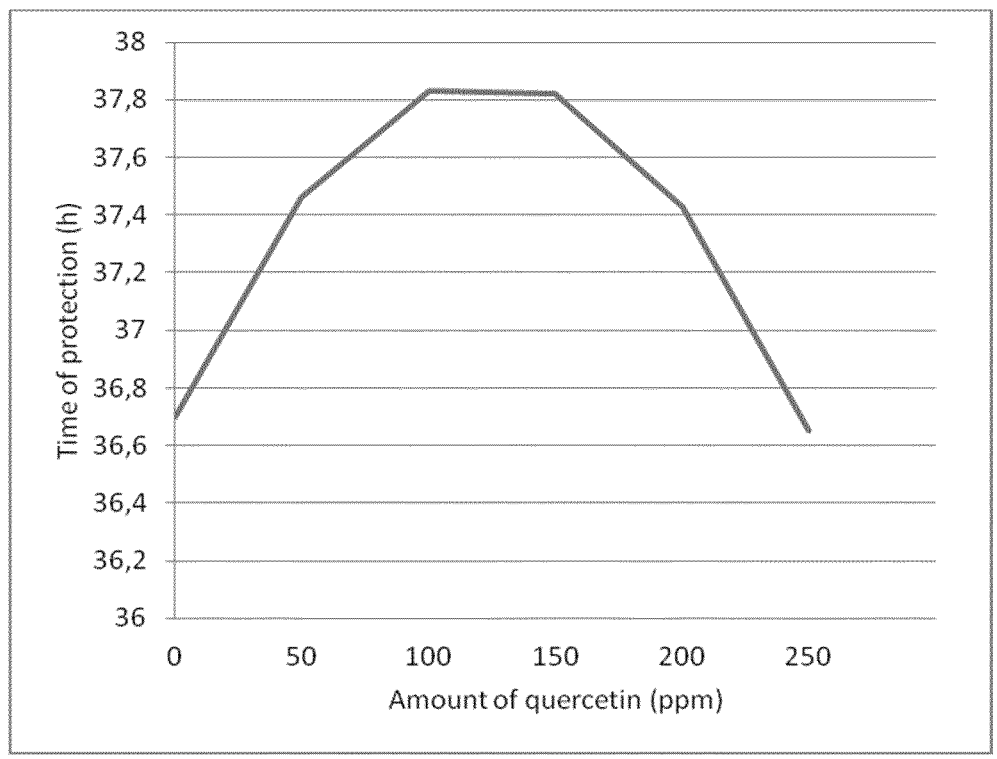
FIG. 7: Time of protection (period expressed in hours) determined on poultry fat containing 200 ppm of tocopherols, 100 ppm of carnosic acid and 100 ppm of hydrolysable gallotannins (ratio CA:GA of 1:1) and different amounts of quercetin.

In FIG. 7, 200 ppm of tocopherols, 100 ppm of carnosic acid and 100 ppm of hydrolysable gallotannins (ratio CA:GA of 1:1) were added into poultry fats, in combination or not with quercetin, the amount of which is represented in FIG. 7.

Figure 8:
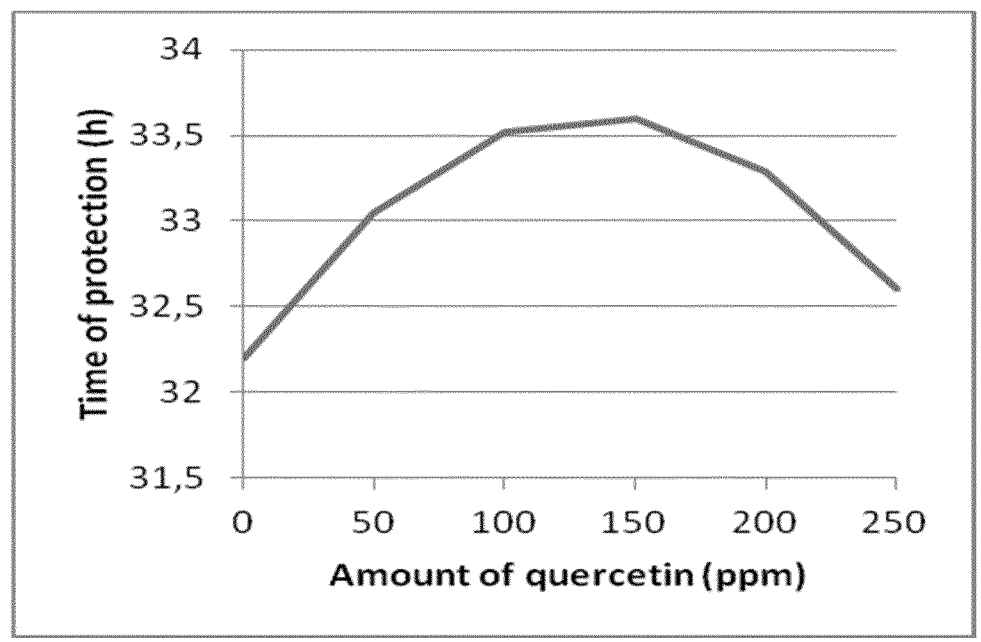
FIG. 8: Time of protection (period expressed in hours) determined on poultry fat containing 100 ppm of tocopherols, 60 ppm of carnosic acid and 20 ppm of hydrolysable gallotannins (ratio CA:GA of 3:1) and different amounts of quercetin.

In FIG. 8, 100 ppm of tocopherols, 60 ppm of carnosic acid and 20 ppm of hydrolysable gallotannins (ratio CA:GA of 3:1) were added into poultry fats, in combination or not with quercetin, the amount of which is represented in FIG. 8.

As shown in FIGS. 5 to 8, whatever the ratio of carnosic acid and hydrolysable gallotannins (1:2, 1:4, 1:1 or 3:1) and whatever the amount of tocopherols, carnosic acid and hydrolysable gallotannins, the time of protection of the combination of tocopherols, carnosic acid and hydrolysable gallotannins is significantly enhanced when quercetin is added. The addition of quercetin is particularly advantageous when not exceeding 150 ppm of quercetin. Indeed, the addition of quercetin until 150 ppm exponentially enhances the time of protection whereas the addition of more than 150 ppm results in a decrease of the time of protection.

2.9. Example 9—Effect on the Time of Protection of a Combination of the Invention Comprising Hydroxytyrosol and Incorporated into a Fat Fats comprising antioxidants were prepared according to Example 1.2.1. by incorporating antioxidants into salmon oil.

Figure 9:
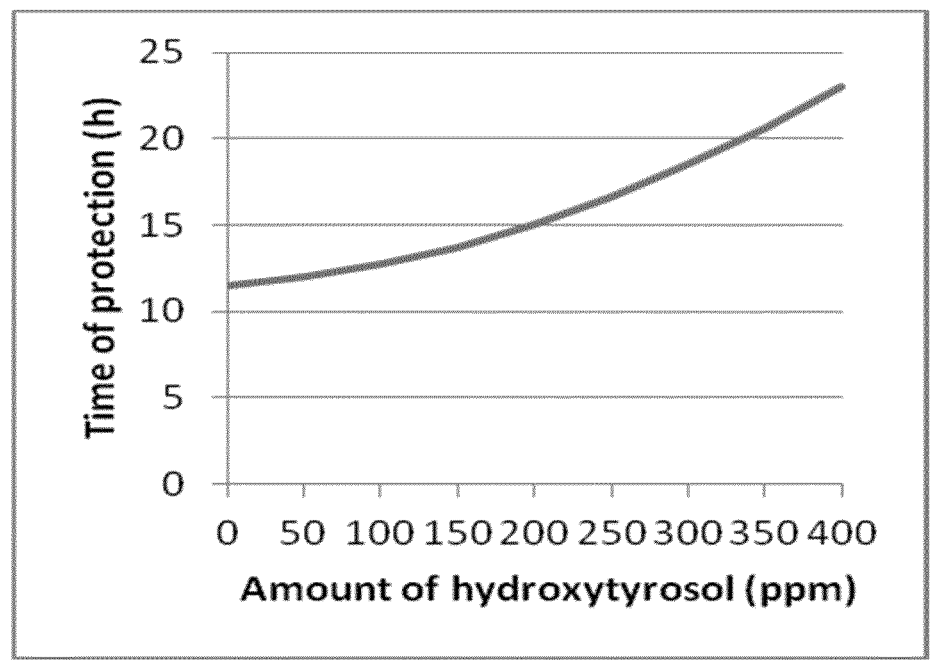
FIG. 9: Time of protection (period expressed in hours) determined on salmon oil containing 500 ppm of tocopherols, 50 ppm of carnosic acid and 200 ppm of hydrolysable gallotannins (ratio CA:GA of 1:4) and different amounts of hydroxytyrosol.
Figure 10:
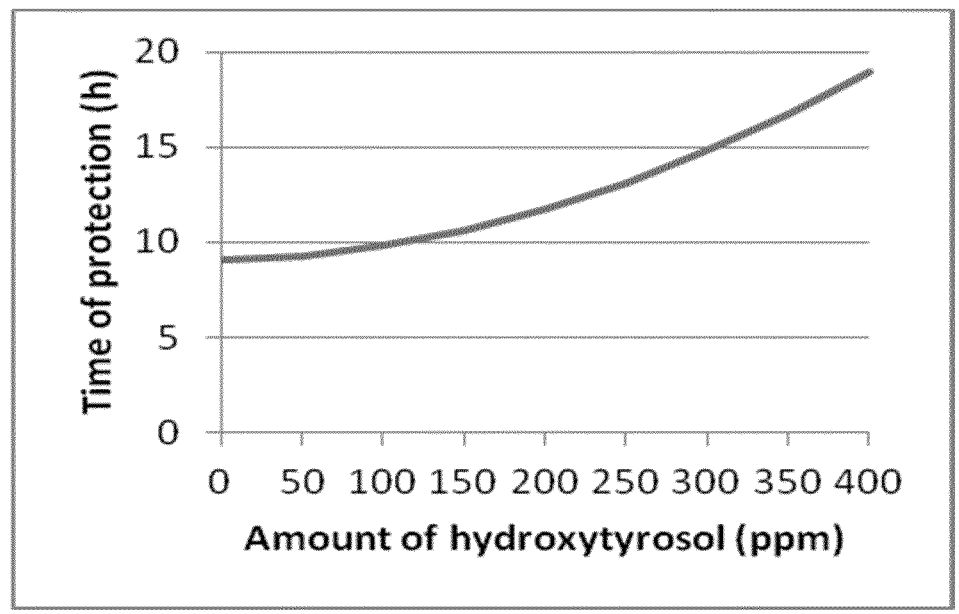
FIG. 10: Time of protection (period expressed in hours) determined on salmon oil containing 300 ppm of tocopherols, 100 ppm of carnosic acid and 100 ppm of hydrolysable gallotannins (ratio CA:GA of 1:1) and different amounts of hydroxytyrosol.

The time of protection measured on the different fats is shown in FIGS. 9 and 10.

In FIG. 9, 500 ppm of tocopherols, 50 ppm of carnosic acid and 200 ppm of hydrolysable gallotannins (ratio CA:GA of 1:4) were added into salmon oils, in combination or not with hydroxytyrosol, the amount of which is represented in FIG. 9.

In FIG. 10, 300 ppm of tocopherols, 100 ppm of carnosic acid and 100 ppm of hydrolysable gallotannins (ratio CA:GA of 1:1) were added into salmon oils, in combination or not with hydroxytyrosol, the amount of which is represented in FIG. 10.

As shown in FIGS. 9 and 10, whatever the ratio of carnosic acid and hydrolysable gallotannins (1:4, 1:1) and whatever the amount of tocopherols, carnosic acid and hydrolysable gallotannins, the time of protection of the combination of tocopherols, carnosic acid and hydrolysable gallotannins is significantly enhanced when hydroxytyrosol is added. The addition of hydroxytyrosol is particularly advantageous when more than 50 ppm of hydroxytyrosol is added, the time of protection being exponentially enhanced.

2.10. Example 10—Effect on Palatability to Dogs of a Combination of the Invention A. Antioxidant Combination Comprising Gallic Acid as Hydrolysable Gallotanins Nutritionally-balanced dry kibbles, herein referred to as "XX", were prepared according to Example 1.2.2 by coating poultry fat (6%) comprising antioxidants, and 2% of poultry liver digest, onto dry kibbles "XX".

Table 9 below shows the type and amounts of antioxidant(s) used into the poultry fat.

TABLE 9

| Composition | Tocopherols | Carnosic Acid | Gallic acid | Ratio GA:CA |
|---|---|---|---|---|
| Comparative Diet no23 | 360 | 0 | 0 | — |
| Comparative Diet no24 | 400 | 0 | 0 | — |
| Comparative Diet no25 | 200 | 150 | 10 | 15:1 |
| Experimental Diet no23 | 200 | 120 | 40 | 3:1 |
| Experimental Diet no24 | 200 | 40 | 160 | 1:4 |

Versus tests were performed to compare palatability to dogs of Comparative Diets 23/24/25 having a ratio CA:GA out of the invention with Experimental Diet 23/24 having a ratio GA:CA according to the invention. The results are presented in Table 10.

TABLE 10

| Food A | Food B | Consumption ratio % A | Consumption ratio % B | Significance |
|---|---|---|---|---|
| Experimental Diet no23 (ratio 3:1) | Comparative Diet no23 (only tocopherols) | 65 | 35 | * |
| Experimental Diet no24 (ratio 1:4) | Comparative Diet no24 (only tocopherols) | 64 | 36 | * |
| Comparative Diet no25 (ratio 15:1) | Comparative Diet no23 (only tocopherols) | 54 | 46 | NS |

As shown in Table 10, dogs' consumptions were significantly higher when the diets contained a combination according to the invention compared to diets containing tocopherols only. However, dog's consumptions were not significantly different when the diets contained a combination with a ratio CA:GA out of the invention compared to diets containing tocopherols only.

B. Antioxidant Combination Comprising Tannic Acid as Hydrolysable Gallotanins

Nutritionally-balanced dry kibbles, herein referred to as "ZZ", were prepared according to Example 1.2.3 by incorporating antioxidants into dry kibbles "ZZ" by inclusion.

Versus tests were performed to compare palatability to dogs of Comparative Diet 26, comprising tocopherols only (210 ppm) with Experimental Diet 25 comprising 105 ppm of tocopherols, 20 ppm of carnosic acid, 75 ppm of tannic acid (ratio GA:CA of 1:3.75). The results are presented in Table 11.

TABLE 11

| Food A | Food B | Consumption ratio % A | Consumption ratio % B | Significance |
|---|---|---|---|---|
| Comparative Diet no26 (only tocopherols) | Experimental Diet no25 (ratio 1:3.75) | 24 | 76 | *** |

As shown in Table 11, dogs' consumptions were significantly higher when the diets contained a combination according to the invention compared to diets containing tocopherols only.

2.11. Example 11—Effect on Palatability to Cats of a Combination of the Invention Nutritionally-balanced dry kibbles, herein referred to as "YY", were prepared according to Example 1.2.2 by coating poultry fat (6%) comprising antioxidants, as well as 3% of pork liver digest, onto dry kibbles "YY".

Table 12 below shows the type and amounts of antioxidant(s) used into the poultry fat.

TABLE 12

| Composition | Tocopherols | Carnosic Acid | Hydrolysable gallotannins | Ratio GA:CA |
|---|---|---|---|---|
| Comparative Diet no27 | 360 | 0 | 0 | — |
| Comparative Diet no28 | 200 | 150 | 10 | — |
| Experimental Diet no26 | 200 | 40 | 120 | 3:1 |
| Experimental Diet no27 | 200 | 120 | 40 | 1:3 |

Versus tests were performed to compare palatability to cats of Comparative Diets 27/28 having a ratio CA:GA out of the invention with Experimental Diet 26/27 having a ratio GA:CA according to the invention. The results are presented in Table 13.

TABLE 13

| Food A | Food B | Consumption ratio % A | Consumption ratio % B | Significance |
|---|---|---|---|---|
| Experimental Diet no26 (ratio 1:3) | Comparative Diet no27 (only tocopherols) | 50 | 50 | NS |
| Experimental Diet no27 (ratio 3:1) | Comparative Diet no27 (only tocopherols) | 46 | 54 | NS |
| Comparative Diet no28 (ratio 15:1) | Comparative Diet no27 (only tocopherols) | 30 | 70 | *** |

As shown in Table 13, cats' consumptions were not significantly different when the diets contained a combination with a ratio CA:GA according to the invention compared to diets containing tocopherols only. However, cats' consumptions were significantly inferior when the diets contained a combination with a ratio CA:GA out of the invention compared to diets containing tocopherols only.

2.12. Example 12—Effect on Palatability to Dogs of a Combination of the Invention Compared to a Synthetic Antioxidant Nutritionally-balanced dry kibbles, herein referred to as "XX", were prepared according to Example 1.2.2 by coating poultry fat (6%) comprising antioxidants, as well as 2% of poultry liver digest, onto dry kibbles "XX".

Versus tests were performed to compare palatability to dogs of the Experimental Diet no 24 and a Comparative Diet 29 coated with poultry fat comprising a synthetic antioxidant mix (BHA, citric acid and propyl gallate).

Versus tests were also performed to compare palatability to dogs of the Comparative Diet 29 and an Experimental Diet no 28 coated with poultry fat comprising 200 ppm of tocopherols, 66 ppm of carnosic acid, 134 ppm of gallic acid, 100 ppm of hydroxytyrosol and 100 ppm quercetin.

The results are presented in Table 14.

TABLE 14

| Food A | Food B | Consumption ratio % A | Consumption ratio % B | Significance |
|---|---|---|---|---|
| Experimental Diet no24 | Comparative Diet no29 | 50 | 50 | NS |
| Experimental Diet no28 | Comparative Diet no29 | 48 | 52 | NS |

As shown in Table 14, dogs' consumptions were not significantly different when the diets contained a (natural) composition according to the invention compared to a synthetic antioxidant.

REFERENCES

Brewer M S. 2011. Natural antioxidants: Sources, compounds, mechanisms of action and potential applications. Comprehensive Reviews in Food Science and Food Safety, 10: 221-247.

Pokorny J, Trajakova L and Takacsova M. 2001. The use of natural antioxidants in food products of plant origin. In Antioxidants in Food—Practical applications. Pokorny J, Yanishlieva N and Gordon M. Eds, Cambridge: Woodhead publishing, pp 355-372.

Namal Senanayake. 2013. Green tea extract: Chemistry, antioxidant properties and food applications—A review. Journal of Functional Foods. On line publication.

L. Haak et al. "Effect of dietary rosemary and α-tocopheryl acetate on the oxidative stability of raw and cooked pork following oxidized linseed oil administration", Meat Science 78 (2008), 239-247.

The invention claimed is:

1. An antioxidant combination of at least tocopherols, carnosic acid and hydrolysable gallotannins, wherein:
   the amount of tocopherols is less than 500 ppm, and
   the ratio of carnosic acid:hydrolysable gallotannins ranges from 1:4 to 3:1.

2. The antioxidant combination according to claim 1, wherein said tocopherols are natural mixed tocopherols.

3. The antioxidant combination according to claim 1, wherein said carnosic acid is from rosemary.

4. The antioxidant combination according to claim 1, wherein said hydrolysable gallotannins is gallic acid.

5. The antioxidant combination according to claim 1, wherein said antioxidant combination further comprises at least one antioxidant selected from hydroxytyrosol and quercetin.

6. The antioxidant combination according to claim 5, wherein said antioxidant combination further comprises hydroxytyrosol in an amount greater than 50 ppm.

7. The antioxidant combination according to claim 5, wherein said hydroxytyrosol is from olive extract.

8. The antioxidant combination according to claim 5, wherein said antioxidant combination further comprises quercetin in an amount lower than 150 ppm.

9. A method for delaying fat-oxidation over time in a fat-containing composition, comprising:
   adding the antioxidant combination according to claim 1 to the fat-containing composition.

10. The method according to claim 9, wherein said fat-containing composition is a pet food composition.

11. The method according to claim 9, wherein said fat-containing composition is a fat-containing food ingredient selected from the group consisting of a fat, a palatability-enhancing composition comprising fat, and a meal comprising fat.

* * * * *

UNITED STATES PATENT AND TRADEMARK OFFICE
CERTIFICATE OF CORRECTION

PATENT NO. : 10,750,770 B2
APPLICATION NO. : 15/776309
DATED : August 25, 2020
INVENTOR(S) : Françoise Michel-Salaun et al.

Page 1 of 1

It is certified that error appears in the above-identified patent and that said Letters Patent is hereby corrected as shown below:

In the Claims

At Column 34, Line 55 (in Claim 9):
Change "A method for delaying fat-oxidation over time in a"
To -- A method for delaying fat-oxidation in a --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*